(12) United States Patent
Okada et al.

(10) Patent No.: US 8,391,677 B2
(45) Date of Patent: Mar. 5, 2013

(54) RECORDING MEDIUM, REPRODUCTION DEVICE, PROGRAM, REPRODUCTION METHOD

(75) Inventors: Tomoyuki Okada, Nara (JP); Wataru Ikeda, Osaka (JP); Yasushi Uesaka, Hyogo (JP)

(73) Assignee: Panasonic Corporation, Osaka (JP)

( * ) Notice: Subject to any disclaimer, the term of this patent is extended or adjusted under 35 U.S.C. 154(b) by 1255 days.

(21) Appl. No.: 10/584,809

(22) PCT Filed: Jan. 7, 2005

(86) PCT No.: PCT/JP2005/000144
§ 371 (c)(1),
(2), (4) Date: Oct. 16, 2008

(87) PCT Pub. No.: WO2005/067293
PCT Pub. Date: Jul. 21, 2005

(65) Prior Publication Data
US 2009/0034939 A1 Feb. 5, 2009

(30) Foreign Application Priority Data
Jan. 9, 2004 (JP) ................................ 2004-003856

(51) Int. Cl.
*H04N 9/80* (2006.01)
(52) U.S. Cl. ........................................ 386/261; 386/262
(58) Field of Classification Search .................... 386/46, 386/95, 124–126, 239, 261, 262, 234, 334; 705/67; 725/28; 369/47.13, 53.21, 275.3
See application file for complete search history.

(56) References Cited

U.S. PATENT DOCUMENTS

| | | | |
|---|---|---|---|
| 5,691,972 A * | 11/1997 | Tsuga et al. | 369/275.3 |
| 6,405,203 B1 | 6/2002 | Collart | |
| 6,453,420 B1 | 9/2002 | Collart | |
| 6,529,949 B1 | 3/2003 | Getsin et al. | |
| 6,665,489 B2 | 12/2003 | Collart | |
| 6,760,915 B2 * | 7/2004 | deCarmo | 725/28 |
| 6,769,130 B1 | 7/2004 | Getsin et al. | |
| 6,847,777 B1 * | 1/2005 | Nakamura | 386/261 |
| 6,941,383 B1 | 9/2005 | Getsin et al. | |

(Continued)

FOREIGN PATENT DOCUMENTS

| | | |
|---|---|---|
| EP | 0 810 603 | 12/1997 |
| JP | 11-150707 | 6/1999 |

(Continued)

OTHER PUBLICATIONS

Japanese Application No. 2005-516907 Office Action dated Aug. 3, 2010, 2 pages.

(Continued)

*Primary Examiner* — Thai Tran
*Assistant Examiner* — Mishawn Dunn

(57) ABSTRACT

The present invention is a BD-ROM having AVClips and PlayList information pieces, which are playback paths for the AVClips, recorded thereon. In addition, the BD-ROM also has multiple playback paths and dynamic scenarios recorded thereon. The dynamic scenarios instruct a playback device to play a digital stream using the playback paths. The dynamic scenarios include selection procedures (IF-statement blocks) which cause the playback device to compare a constant and a register-stored value indicating a user's age set on the playback device, (PSR(13)), and to select a playback path from among the multiple playback paths according to the result of the comparison.

12 Claims, 38 Drawing Sheets

U.S. PATENT DOCUMENTS

| | | |
|---|---|---|
| 6,944,621 B1 | 9/2005 | Collart |
| 6,957,220 B2 | 10/2005 | Lamkin et al. |
| 6,973,461 B1 * | 12/2005 | Fleming et al. ............... 386/334 |
| 7,024,497 B1 | 4/2006 | Maffezoni |
| 7,178,106 B2 | 2/2007 | Lamkin et al. |
| 7,188,193 B1 | 3/2007 | Getsin et al. |
| 7,269,634 B2 | 9/2007 | Getsin et al. |
| 7,332,623 B2 | 2/2008 | Wu et al. |
| 7,346,920 B2 | 3/2008 | Lamkin et al. |
| 7,379,661 B2 | 5/2008 | Lamkin et al. |
| 7,392,481 B2 | 6/2008 | Gewickey et al. |
| 7,448,021 B1 | 11/2008 | Lamkin et al. |
| 7,454,515 B2 | 11/2008 | Lamkin et al. |
| 7,458,091 B1 | 11/2008 | Getsin et al. |
| 7,499,938 B2 | 3/2009 | Collart |
| 7,505,992 B2 | 3/2009 | Collart |
| 7,577,677 B2 | 8/2009 | Collart |
| 7,689,510 B2 | 3/2010 | Lamkin et al. |
| 7,711,795 B2 | 5/2010 | Getsin et al. |
| 7,712,115 B2 * | 5/2010 | Van Horck ...................... 725/28 |
| 7,748,070 B2 | 7/2010 | Chan et al. |
| 7,779,097 B2 | 8/2010 | Lamkin et al. |
| 7,845,039 B2 | 12/2010 | Chan et al. |
| 2002/0078144 A1 | 6/2002 | Lamkin et al. |
| 2002/0091575 A1 | 7/2002 | Collart |
| 2002/0110058 A1 * | 8/2002 | Hamada et al. ............ 369/47.13 |
| 2002/0133708 A1 * | 9/2002 | Gudorf et al. ................. 713/186 |
| 2003/0014412 A1 | 1/2003 | Collart |
| 2004/0205155 A1 * | 10/2004 | Nobakht et al. ............... 709/217 |
| 2004/0220791 A1 | 11/2004 | Lamkin et al. |
| 2004/0220926 A1 | 11/2004 | Lamkin et al. |
| 2004/0244041 A1 | 12/2004 | Getsin et al. |
| 2005/0004211 A1 | 1/2005 | Wu et al. |
| 2005/0041150 A1 | 2/2005 | Gewickey et al. |
| 2005/0050659 A1 | 3/2005 | Chan et al. |
| 2005/0053895 A1 | 3/2005 | Pinyayev et al. |
| 2005/0053896 A1 | 3/2005 | Pinyayev et al. |
| 2005/0053898 A1 | 3/2005 | Ghosh et al. |
| 2005/0066459 A1 | 3/2005 | Pinyayev et al. |
| 2005/0166232 A1 | 7/2005 | Lamkin et al. |
| 2005/0182828 A1 | 8/2005 | Lamkin et al. |
| 2005/0193322 A1 | 9/2005 | Lamkin et al. |
| 2005/0198574 A1 | 9/2005 | Lamkin et al. |
| 2005/0251732 A1 | 11/2005 | Lamkin et al. |
| 2005/0265701 A1 | 12/2005 | Lamkin et al. |
| 2005/0278435 A1 | 12/2005 | Lamkin et al. |
| 2005/0278729 A1 | 12/2005 | Lamkin et al. |
| 2006/0004778 A1 | 1/2006 | Lamkin et al. |
| 2006/0041639 A1 | 2/2006 | Lamkin et al. |
| 2006/0041640 A1 | 2/2006 | Lamkin et al. |
| 2006/0045481 A1 * | 3/2006 | Yahata et al. ................... 386/95 |
| 2006/0085574 A1 | 4/2006 | Maffezoni |
| 2006/0107215 A1 | 5/2006 | Gewickey et al. |
| 2006/0112336 A1 | 5/2006 | Gewickey et al. |
| 2006/0182424 A1 | 8/2006 | Lamkin et al. |
| 2006/0184538 A1 | 8/2006 | Randall et al. |
| 2006/0193606 A1 | 8/2006 | Lamkin et al. |
| 2006/0257822 A1 | 11/2006 | Ghosh et al. |
| 2007/0298370 A1 | 12/2007 | Pinyayev et al. |
| 2007/0298371 A1 | 12/2007 | Pinyayev et al. |
| 2007/0298372 A1 | 12/2007 | Pinyayev et al. |
| 2008/0072389 A1 | 3/2008 | Ghosh et al. |
| 2011/0321080 A1 * | 12/2011 | Durden et al. ................... 725/28 |

FOREIGN PATENT DOCUMENTS

| | | |
|---|---|---|
| JP | 3007689 | 11/1999 |
| JP | 2000-013728 | 1/2000 |
| JP | 2000-354231 | 12/2000 |
| JP | 2001-186478 | 7/2001 |
| JP | 2001-251582 | 9/2001 |
| JP | 3090128 | 9/2002 |
| JP | 2004-128774 | 4/2004 |
| TW | 466476 | 12/2001 |
| WO | 2004/074976 | 9/2004 |

OTHER PUBLICATIONS

Taiwan Patent Application No. 94100629 dated Jun. 29, 2011, 6 pages.

* cited by examiner

FIG.13

```
function PARENTAL CONTROL{
 if(PSR(20)=Japan){
        PlayPL#1
        if(PSR(13)≦13){
                PlayPL#4
                }
        elseif(PSR(13)≧18){
                PlayPL#3
                }
        else{
                PlayPL#2
                }
        if(PSR(13)≦13){
                PlayPL#6
                }
        else{
                PlayPL#5
                }
        PlayPL#7
        }
 if(PSR(20)=US){
        PlayPL#1
        if(PSR(13)≦13){
                PlayPL#4
                }
        elseif(PSR(13)≧17){
                PlayPL#3
                }
        else{
                PlayPL#2
                }
        if(PSR(13)≦13){
                PlayPL#6
                }
        else{
                PlayPL#5
                }
        PlayPL#7
        }
``` if文block1 if文block2

PROGRAM PART FOR JAPAN

PROGRAM PART FOR US

FIG.30A   CONVERSION TABLE FOR JAPAN

| ADULTS | 18 YRS OLD |
|---|---|
| R | 16 YRS OLD |
| GENERAL | 0 YR OLD |

FIG.30B   CONVERSION TABLE FOR US

| X | 20 YRS OLD |
|---|---|
| NC-17 | 17 YRS OLD |
| R | 17 YRS OLD |
| PG-13 | 14 YRS OLD |
| PG | 10 YRS OLD |
| G | 0 YRS OLD |

FIG.31A  CONVERSION TABLE FOR JAPAN

| ADULTS | 18 YRS OLD |
|---|---|
| R | 16 YRS OLD |
| GENERAL | 0 YR OLD |

FIG.31B  CONVERSION TABLE FOR US

| X | 20 YRS OLD |
|---|---|
| NC-17 | 17 YRS OLD |
| R | 17 YRS OLD |
| PG-13 | 14 YRS OLD |
| PG | 10 YRS OLD |
| G | 0 YRS OLD |

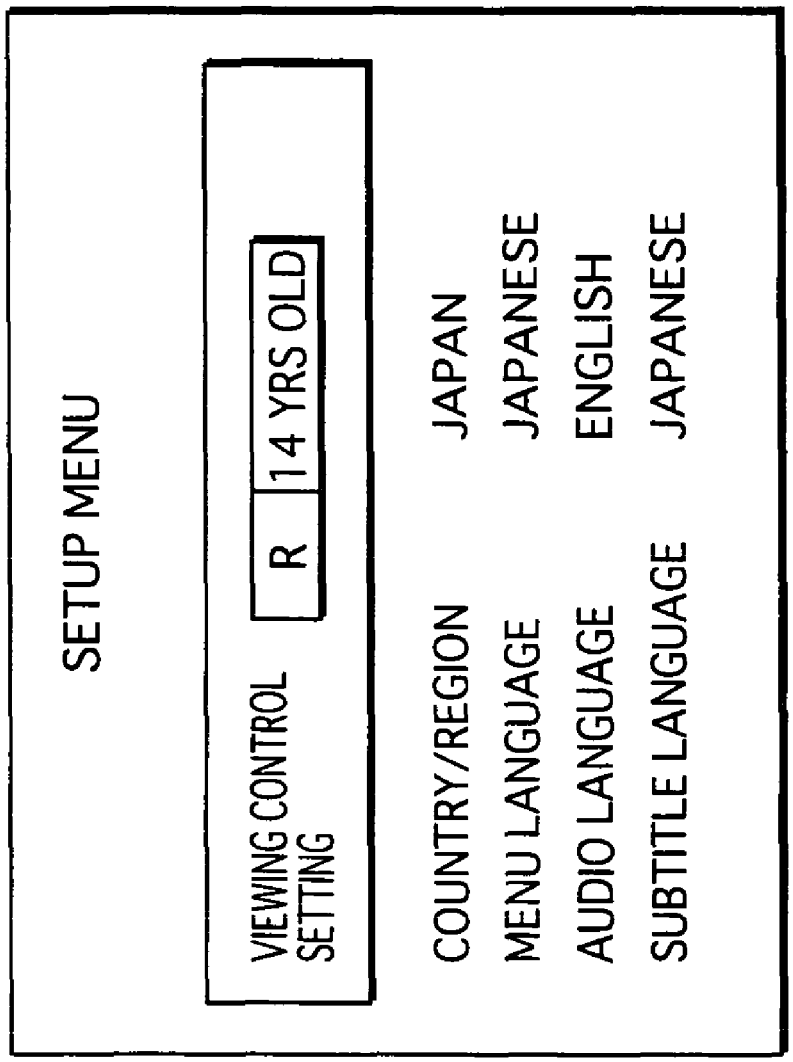
FIG.37
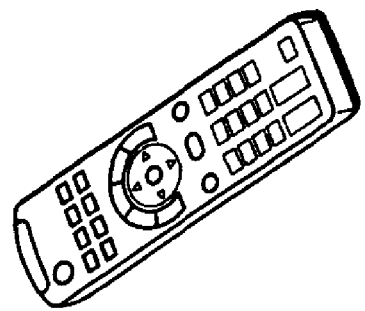
CALLING OF SETUP MENU

RECORDING MEDIUM, REPRODUCTION DEVICE, PROGRAM, REPRODUCTION METHOD

TECHNICAL FIELD

The present invention belongs to a technical field of playback control for digitized movie works, and relates to improvements in applying such playback control technology to BD-ROMs and other recording media and BD-ROM playback devices.

BACKGROUND ART

How to handle extreme video images is a thorny issue for distributors of movie works. Releasing extreme video expressions directly as they are creates friction with sensible people in the distributed areas. On the other hand, not showing such extreme images at all does not meet the demands of the purchasers who want to watch the movie works. Parental control is a technology for resolving such dilemma. This is a technology that selects, based on the level setting on the device, one of multiple playback paths recorded on a recording medium and plays the selected path. Parental control for DVD-Videos is widely known from the disclosure of Patent Reference 1. The level setting is based on ethical standards called a "rating system" defined for each country. Japan has adopted a three-level rating system including General, R rating and Adults, while the United States has established a six-level rating system including G, PG, PG-13, R, NC-17 and X. One of such levels is preset on the playback device, which thereby plays selectively, from among the multiple playback paths recorded on a recording medium, a path having an attribute corresponding to the level. By introducing such parental control, a movie work can be played while extreme expressions therein being replaced with moderate ones, which therefore avoids creating unnecessary friction with sensible people in the distributed areas. Additionally, by replacing the extreme expressions with the moderate equivalents, the consistency of the story is maintained.

<Patent Reference 1> Japanese Patent Publication No. 3007689

<Patent Reference 2> Japanese Patent Publication No. 3069324

DISCLOSURE OF THE INVENTION

Problem that the Invention is to Solve

The prior art disclosed in Patent Reference 1 chiefly aims at providing viewing control over playback of extreme scenes. As to movie works of educational genres, there is demand for changing scenes to be played according to the development of the viewer. However, the technology described in Patent Reference 1 specializes in viewing control based on a rating level and cannot therefore adapt other playback control descriptions, which leads to a problem of poor expansibility. In parental control, age groups subject to viewing control are fixed to those predetermined in a rating system of a country. Since the age groups for playback control are fixed, making the playback control independent of the rating level—for example, playback control that changes scenes to be played according to the development of the user—requires establishment of another procedure to realize so using playback control commands and the like as disclosed in Patent Reference 2, which necessitates a large amount of labor.

The object of the present invention is offering a recording medium having expandability to handle various processes while achieving parental control.

Means to Solve the Problem

In order to achieve the above objective, the recording medium of the present invention comprises: a digital stream; a plurality of pieces of playback path information, each indicating a playback path for the digital stream; and a control program instructing a playback device to play the digital stream using the playback path information. Here, the control program includes a selection procedure which causes the playback device to select at least one of the pieces of playback path information using a value stored in a status register. The value indicates the user's age set on the playback device.

Advantageous Effects of the Invention

Since the above structure causes the playback device to select a digital stream for playback based on a magnitude relation between a constant and the value stored in the register and indicating an age, parental control can be realized by a programmatic description. Because the parental control is realized by the programmatic description, various processes according to the age of the user can be attained by changing the constant and the specification of a playback path to be played. Thus, the present embodiment not only realizes parental control for setting the viewing control, but also can be developed to have various other controls. As a result, the present embodiment is capable of expanding the range of the playback control application, covering from viewing control over access to extreme video images to viewing control for learning materials.

A playback control for controlling the viewing of extreme scenes and a control to change scenes to be played according to the development of the user can be realized by the same description. Accordingly, the present invention would bring significant benefits to authoring developers and make contributions to development of movie work industries.

In addition, by causing the playback device to increase a numeric value stored in the register according to the passage of time, a control to change the order of selecting digital streams according to the development or aging of the user can also be realized.

Furthermore, in the recording medium of the present invention, a configuration of parental control defining which playback path is to be played is specified in a program independent of playback paths. The configuration of parental control can be freely changed by making modification or addition to the program, which whereby achieves expansion of the versatility of parental control. Herewith, in the case when a given video image in the playback path is acknowledged as a problem, a prompt response can be provided by replacing the video image with another video image. Thus, the present invention makes it possible to avoid risk when part of a movie work is criticized as being extreme, and therefore provides a sense of ease to people engaged in producing and distributing movie works.

In addition, since parental control can be implemented if a numeric indicating an age is stored, a proper conversion of the age-indicating numeric into a rating level realizes parental control similar to one used for a DVD-Video.

BRIEF DESCRIPTION OF THE DRAWINGS

FIG. 13 shows an example of a dynamic scenario for defining parental control;

FIG. 30A shows an example of a conversion table for Japan;

FIG. 30B shows an example of a conversion table for the United States;

FIG. 37 shows a setup menu of Embodiment 5.

BEST MODE FOR CARRYING OUT THE INVENTION

Embodiment 1

Figure 1:
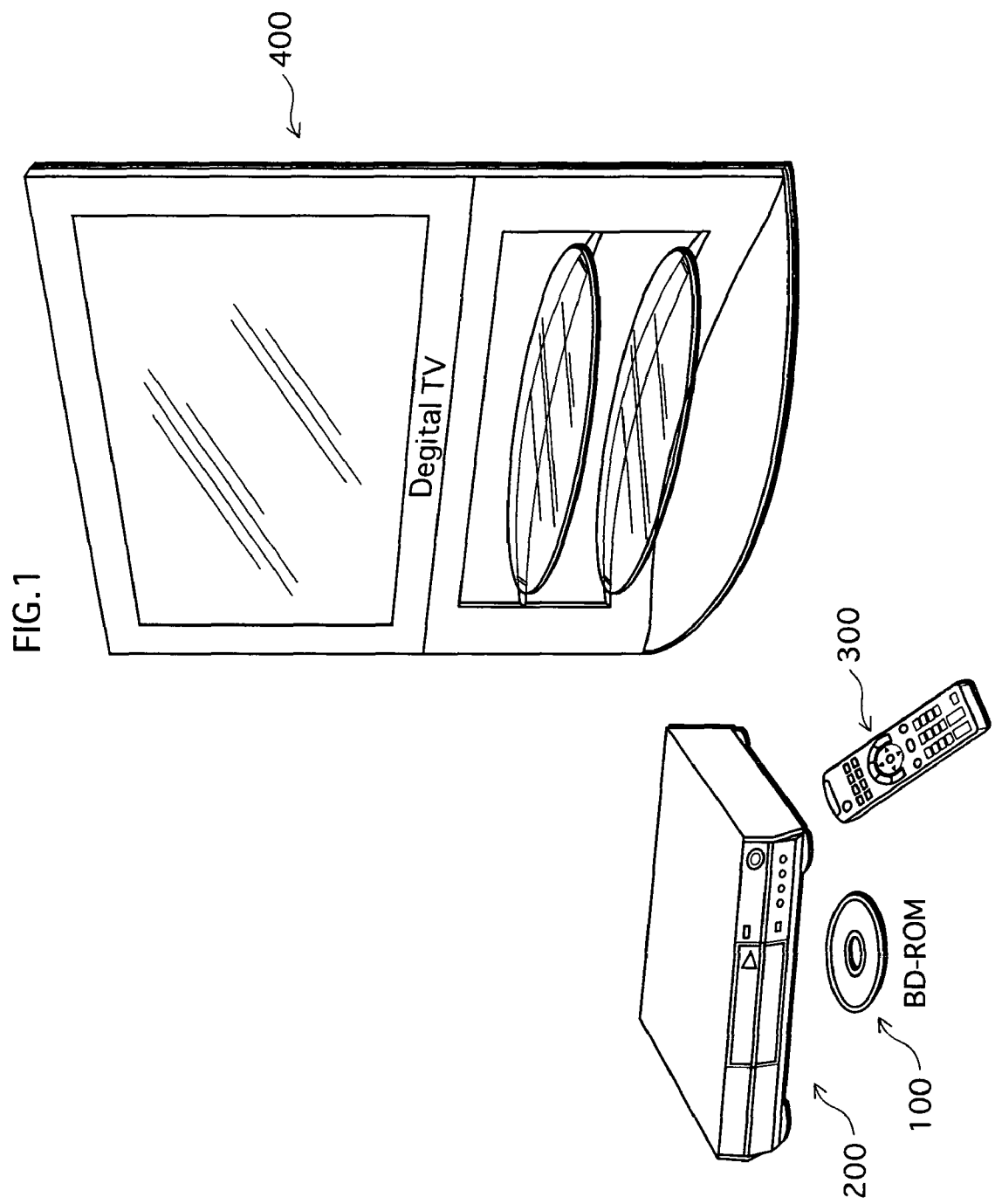
FIG. 1 shows a usage application of a playback device according to the present invention.

The following gives an account of a preferred embodiment of a recording medium pertaining to the present invention. First, a usage application is described in relation to the implementation of the recording medium of the present invention. FIG. 1 shows a usage application of the recording medium of the present invention. A BD-ROM 100 in FIG. 1 is the recording medium of the present invention. The BD-ROM 100 is used for supplying copyrighted works to a home theater system composed of a playback device 200, a remote controller 300 and a television 400.

Thus concludes the description of the usage application of the recording medium pertaining to the present invention.

Figure 2:
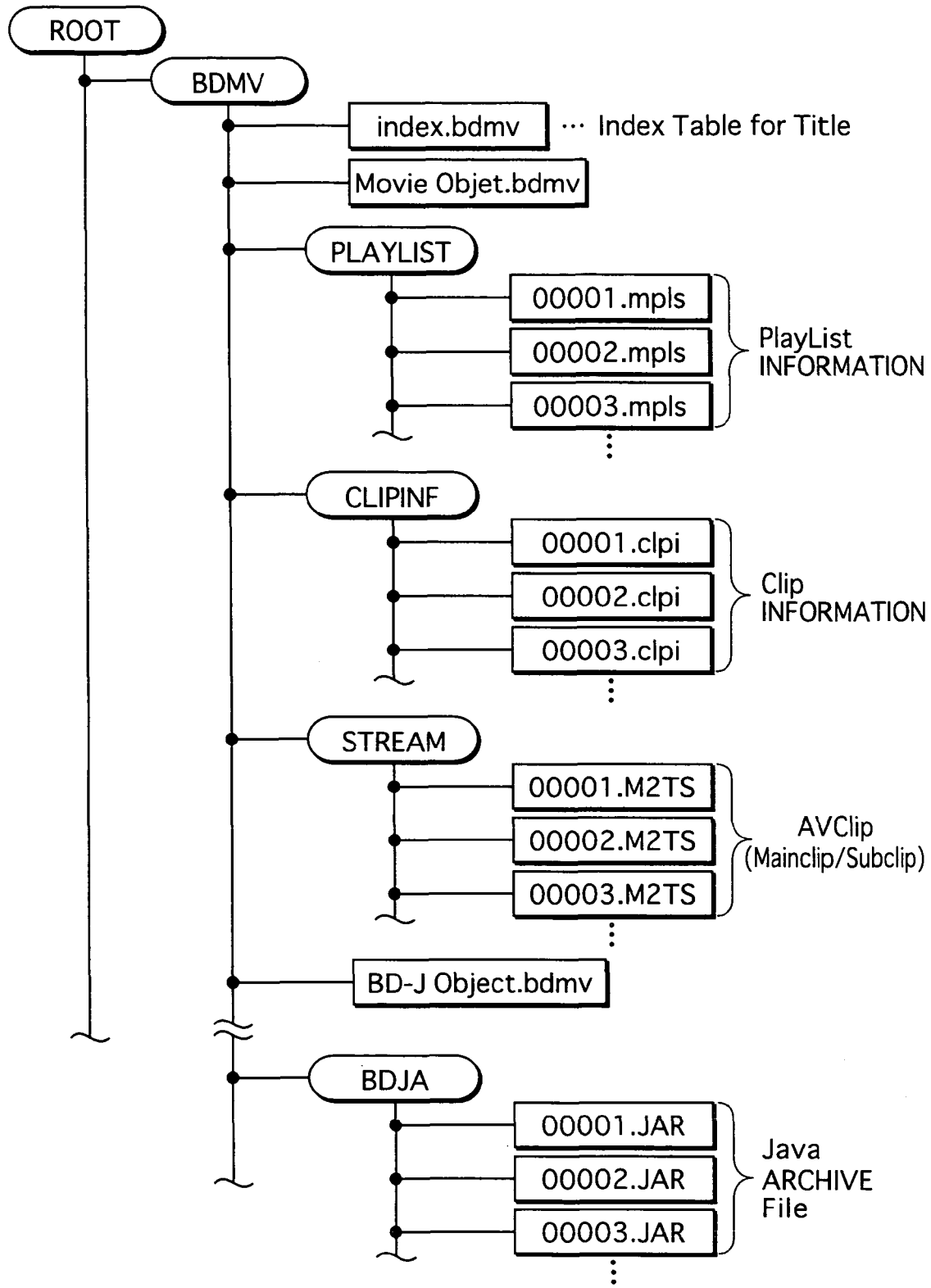
FIG. 2 shows a file directory structure in a BD-ROM.

Next is described a production application of the recording medium of the present invention. The recording medium of the present invention can be implemented as a result of improvements in the file system of a BD-ROM. FIG. 2 shows a file directory structure of a BD-ROM. In the BD-ROM, as shown in the figure, a BDMV directory is located under a ROOT directory.

The BDMV directory includes files to each of which an extension of bdmv is attached (index.bdmv, MovieObject.bdmv and BD-J Object.bdmv). Furthermore, four subdirectories are located under the BDMV directory: a PLAYLIST directory; a CLIPINF directory; a STREAM directory; and a BDJA directory.

The PLAYLIST directory includes files to each of which an extension of mpls is attached (00001.mpls, 00002.mpls, 00003.mpls . . . ).

The CLIPINF directory includes files to each of which an extension of clpi is attached (00001.clip, 00002.clip, 00003.clip . . . ).

The STREAM directory includes files to each of which an extension of m2ts is attached (00001.m2ts, 00002.m2ts, 00003.m2ts . . . ).

The BDJA directory includes files to each of which an extension of jar is attached (00001.jar, 00002.jar, 00003.jar . . . ). Thus, it can be seen that multiple files of different types are arranged in the BD-ROM according to the directory structure above.

The files with the m2ts extension (00001.m2ts, 00002.m2ts, 00003.m2ts . . . ) in the figure store therein AVClips. There are different types of AVClips—MainClip and SubClip. A MainClip is a digital stream obtained by multiplexing multiple elementary streams, such as video streams, audio streams, presentation graphics streams (PG streams) constituting subtitles and interactive graphics streams (IG streams) constituting menus.

A SubClip is a digital stream corresponding to only one elementary stream, such as an audio stream, a graphics stream or a text subtitle stream (TextSTStream).

The files with the "clpi" extension (00001.clpi, 00002.clpi, 00003.clip . . . ) are pieces of management information corresponding one-to-one with AVClips. Since being a managing information piece, each piece of Clip information includes information of a corresponding AVClip in relation to encoding formats of the streams, the frame rate, the bit rate, the resolution and the like, and also EP_map indicating start positions of GOPs.

Figure 3:
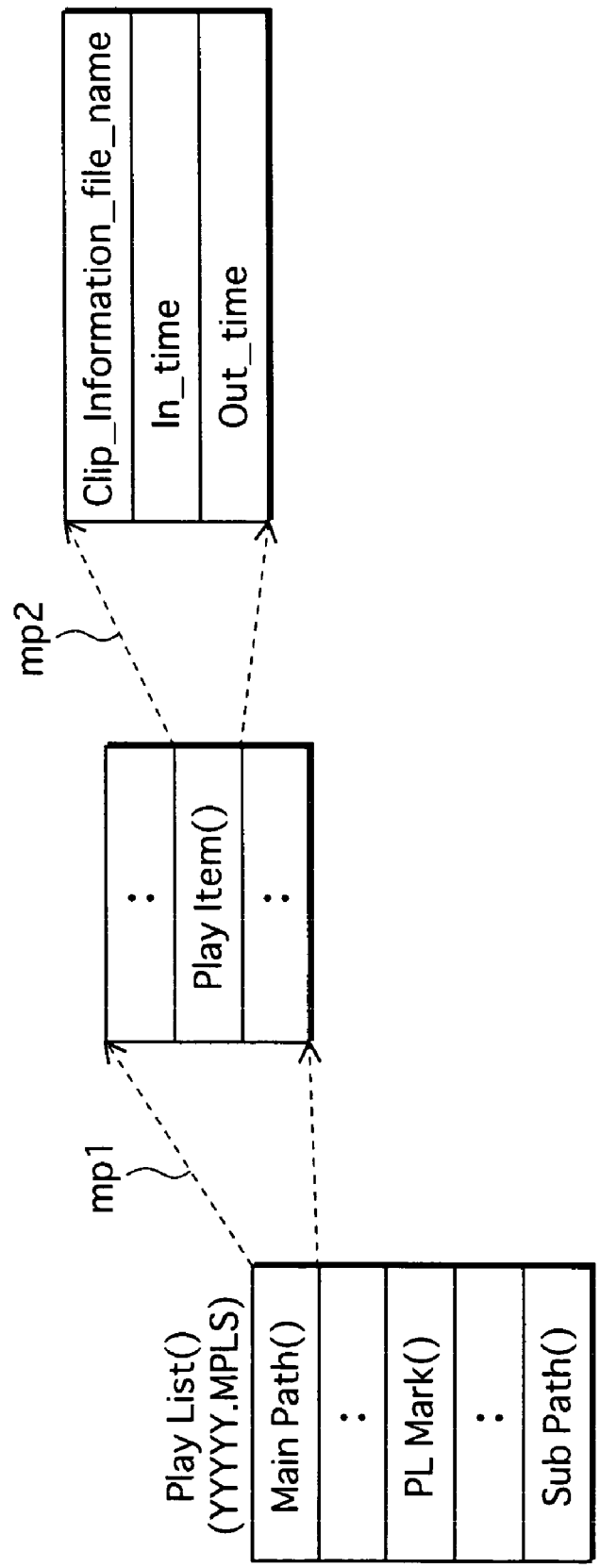
FIG. 3 shows a structure of PL information.

The files with the "mpls" extension (00001.mpls, 00002.mpls, 00003.mpls . . . ) are files storing therein pieces of playlist information. A playlist information piece is information that defines a playlist with reference to an AVClip. FIG. 3 shows a structure of PL information, and a playlist information piece is composed of "MainPath information", "PLMark information" and "SubPath information", as shown on the left side of the figure.

Figure 4:
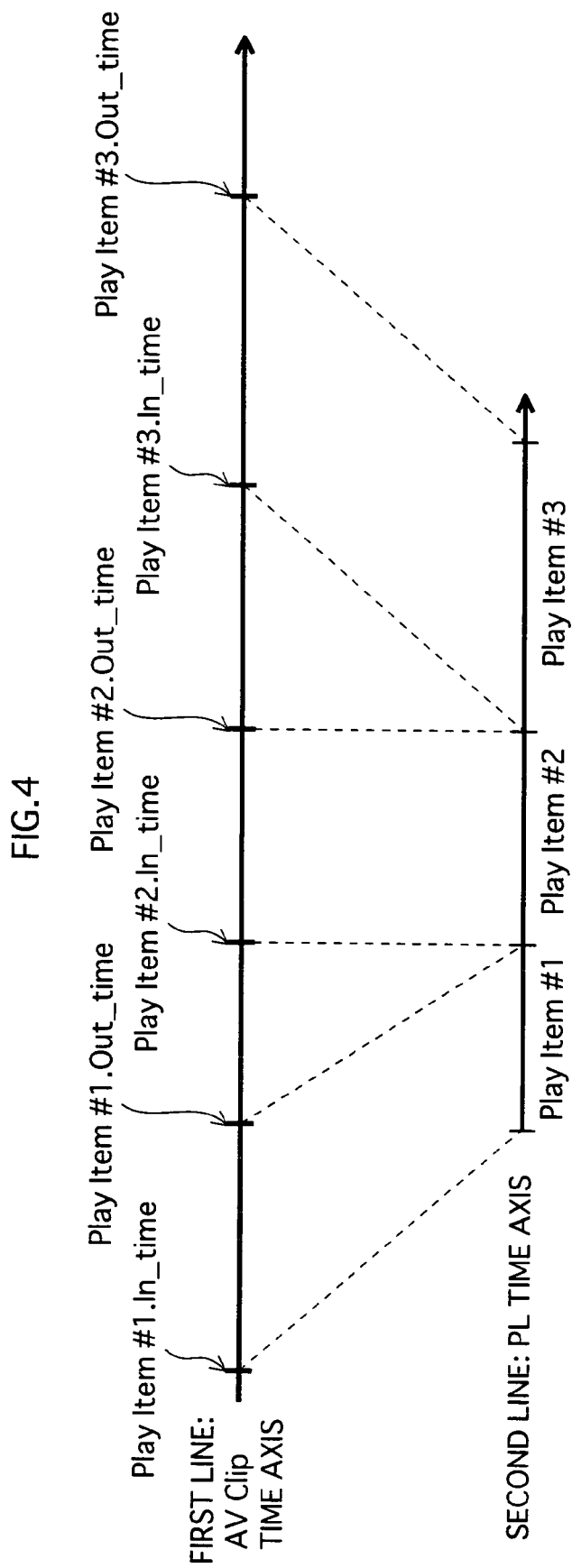
FIG. 4 shows a relationship between an AVClip time axis and a PL time axis.

A MainPath information (MainPath( )) is composed of multiple pieces of PlayItem information (PlayItemo( )), as indicated by the dotted arrow mp1. A PlayItem is a playback section defined by specifying an In_Time and an Out_Time on at least one AVClip time axis. Arranging multiple pieces of PlayItem information defines a playlist (PL) made up of multiple playback sections. The dotted line mp2 in the figure shows the close detail of the internal structure of a piece of PlayItem information. As shown in the figure, a PlayItem information piece is composed of "Clip_information_file_name" indicating a corresponding AVClip, "In_time" and "Out_time". FIG. 4 shows a relationship between an AVClip and a PL. The upper line indicates a time axis of an AVClip, and the second line indicates a time axis of a PL. The PL information includes three pieces of PlayItem information called PlayItems #1, #2 and #3. With In_times and Out_times of the respective PlayItems #1, #2 and #3, three playback sections are defined. Aligning these playback sections defines a different time axis from the AVClip time axis—i.e. the PL time axis of the second line shown in the figure. In this manner, defining a PlayItem information piece enables definition of a time axis different from that of an AVClip.

Figure 5:
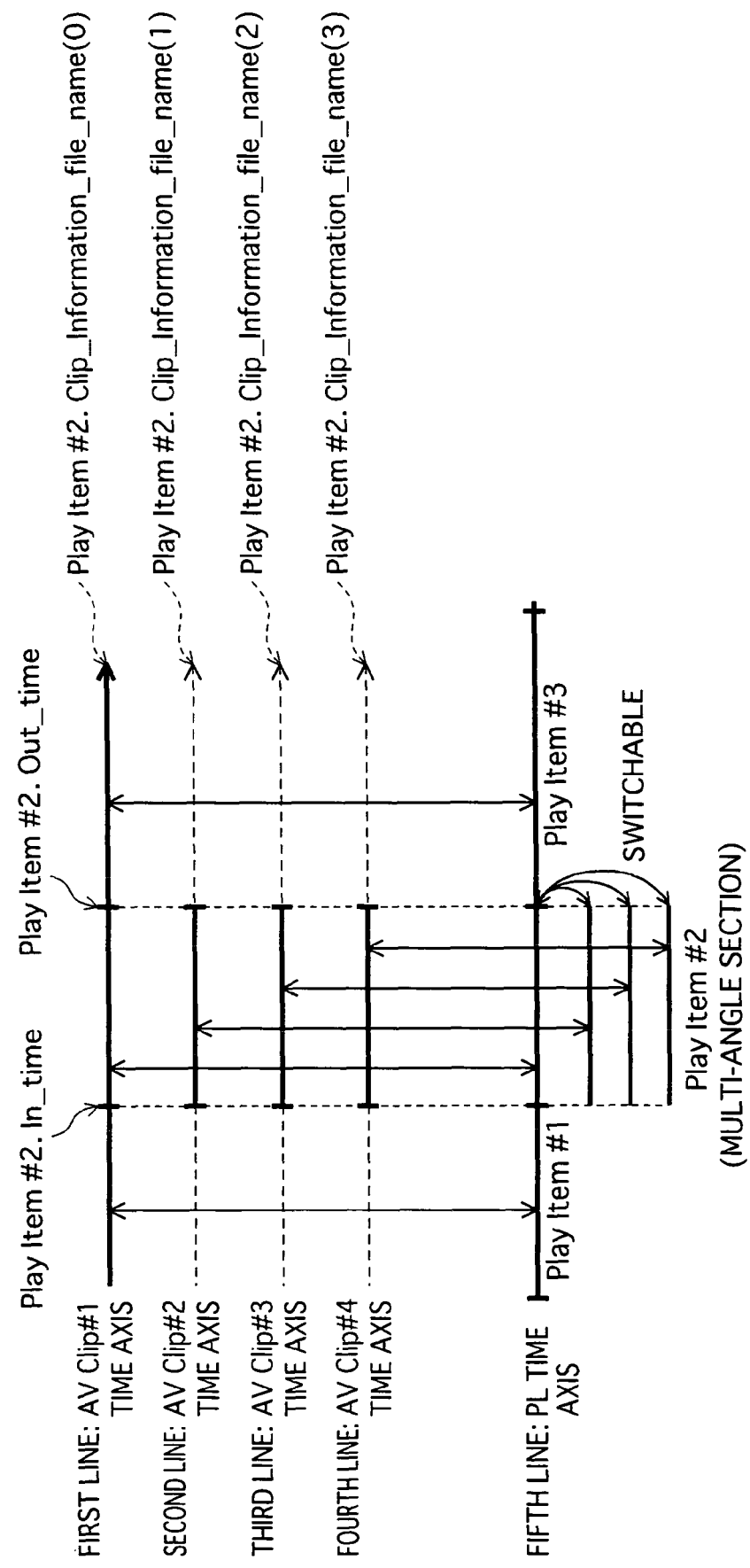
FIG. 5 shows collective specification where four Clip_Information_file_names are specified.

Although, in principle, only one AVClip can be specified, collective specification in which multiple AVClips are specified is also possible. The collective specification is achieved by specifying multiple Clip_Information_file_names in a PlayItem information piece. FIG. 5 shows collective specification where four Clip_Information_file_names are specified. In the figure, the first to fourth lines represent four AVClip time axes (time axes of AVClips #1, #2, #3 and #4) while the fifth shows a PL time axis. These four time axes are specified by the four Clip_Information_file_names included in the PlayItem information piece. Herewith, four playback sections, which are playable in a mutually exclusive manner, are defined by In_times and Out_times included in the PlayItem. Accordingly, a section composed of switchable multi-angle videos (so called multi-angle section) is defined on the PL time axis.

Figure 6:
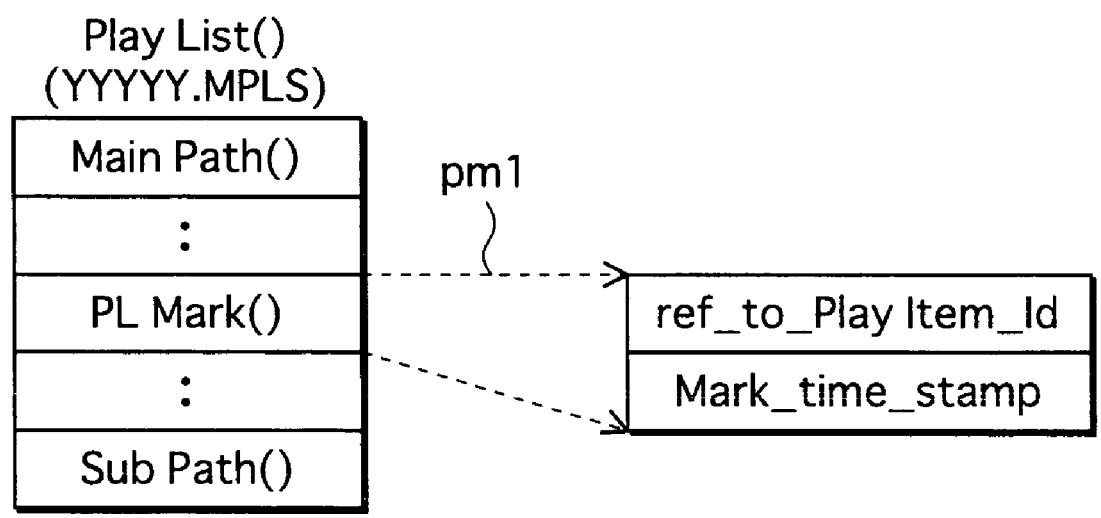
FIG. 6 shows an internal structure of PLmark information.
Figure 7:
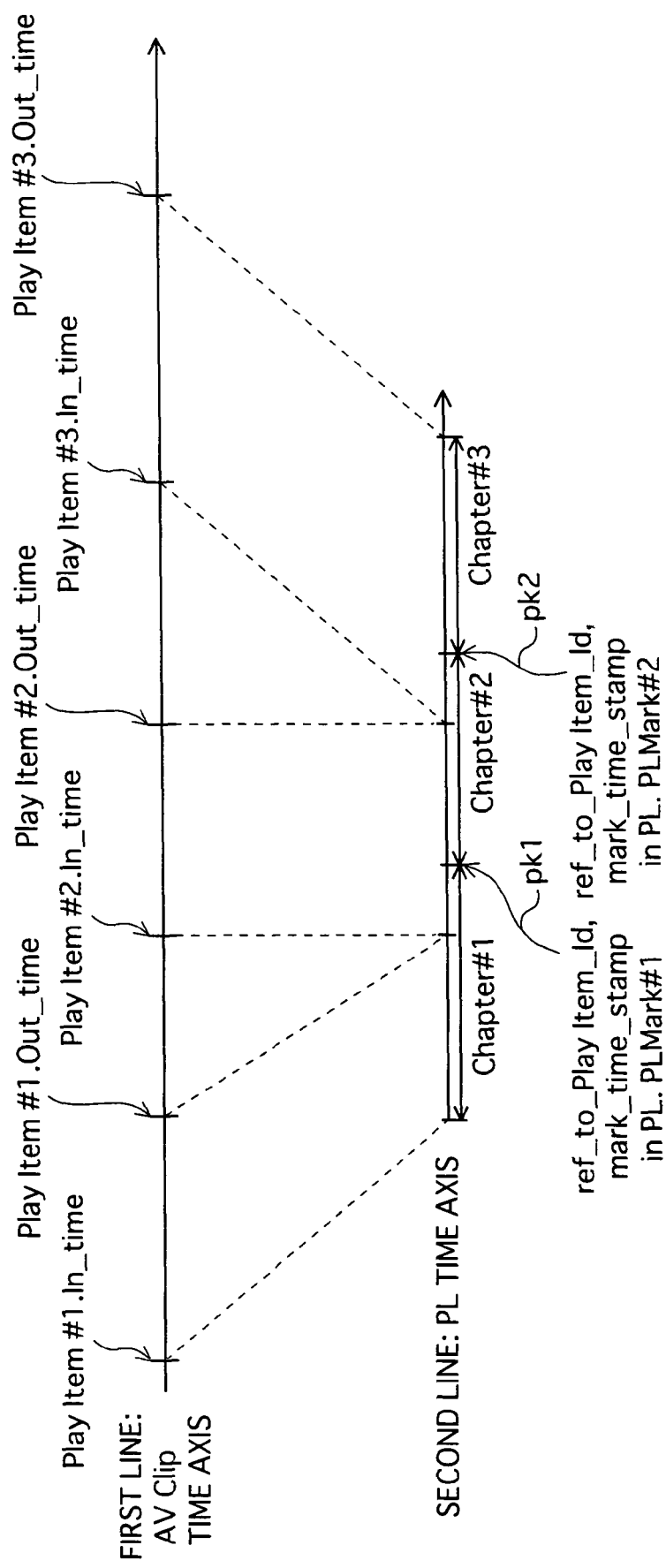
FIG. 7 shows chapter definition by PLmarks.

PLmark information (Plmark( )) is information for specifying a given section on a PL time axis as a chapter. FIG. 6 shows an internal structure of PLmark information, which includes "ref_to_PlayItem_Id" and "Mark_time_stamp", as shown by the lead line pm1 in the figure. FIG. 7 shows chapter definition by PLmarks. The first line in the figure represents an AVClip time axis, and the second line represents a PL time axis. Each of the arrows pk1 and pk2 in the figure indicates a PlayItem specification (ref_to_PlayItem_Id) and a time-point specification (mark_time_stamp) of PLmarks. With these specifications, three chapters (Chapters #1, #2 and #3) are defined on the PL time axis. Thus concludes the description of PLmarks. SubPath information is explained next.

Figure 8:
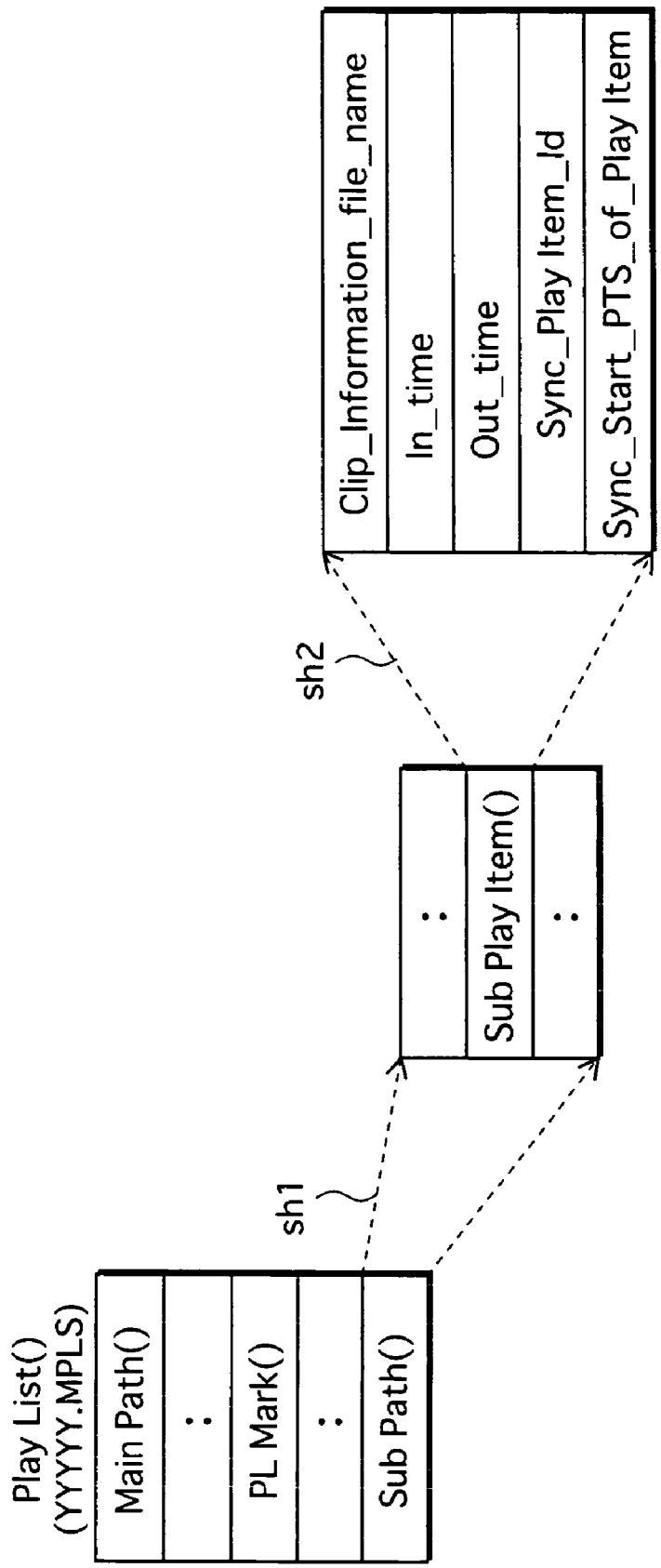
FIG. 8 shows an internal structure of SubPath information.

SubPath information (SubPath( )) is information for defining at least one playback section by specifying an In_Time and an Out_Time on a SubClip time axis. FIG. 8 shows an internal structure of SubPath information. SubPath information, as shown in the figure, is composed of multiple pieces of SubPlayItem information (SubPlayItem( )), as indicated by the dotted lead line sh1. The dotted line sh2 shows the close detail of a piece of SubPlayItem information, which is composed of "Clip_information_file_name", "In_time", "Out_time", "Sync_PlayItem_Id" and "Sync_start_Pts_of_PlayItem". The specifications of an In_time and an Out_Time on the SubClip time axis are made with "Clip_information_file_name", "In_time" and "Out_time". "Sync_PlayItem_Id" and "Sync_start_Pts_of_PlayItem" achieve synchronization specification where the playback sections on the SubClip time axis and the PL time axis are synchronized. According to the synchronization specification, the PL time axis and SubPlayItem time axis proceed synchronously.

Figure 9:
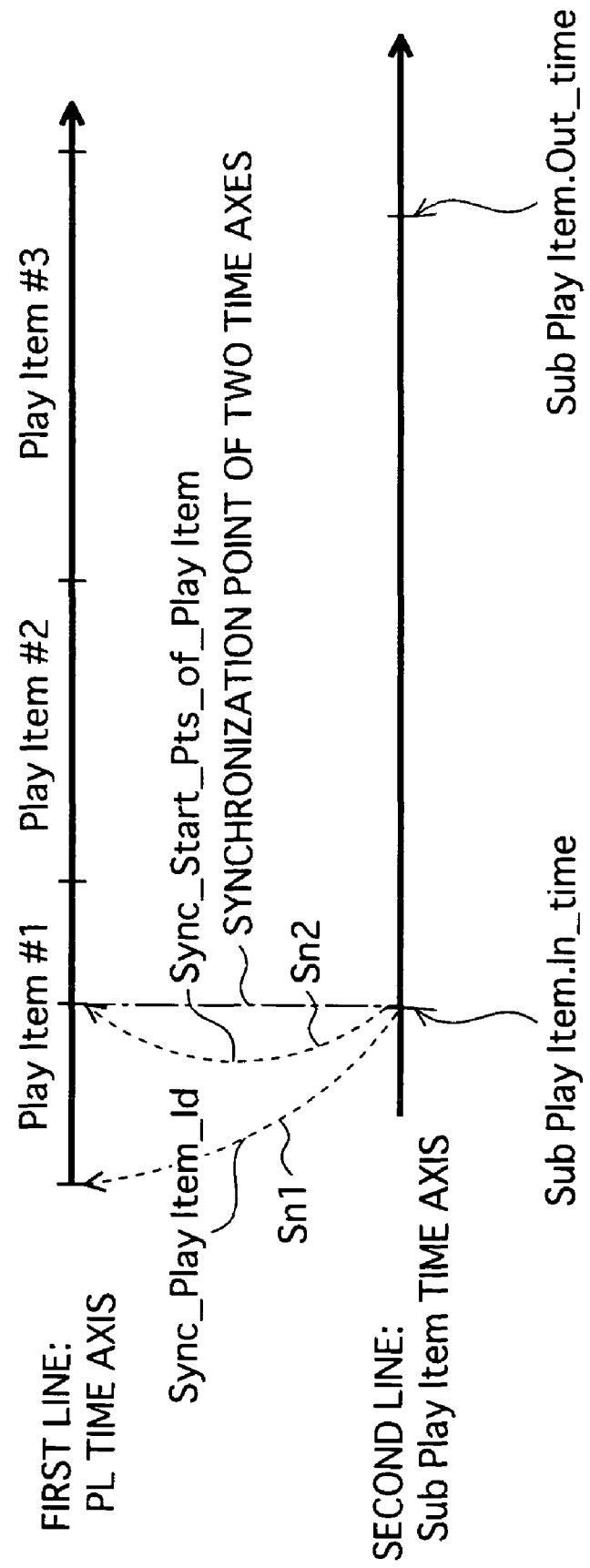
FIG. 9 shows definition of a playback section on a Sub-PlayItem time axis and synchronization specification.

FIG. 9 shows definition of a playback section on a SubPlayItem time axis and synchronization specification. In the figure, the first line represents a PL time axis, and the second line represents a SubPlayItem time axis. SubPlayItem. IN_time in the figure indicates a starting point of the playback section and SubPlayItem.Out_time indicates an end point of the playback section. Thus, it can be seen that a playback section is defined also on the SubClip time axis. Sync_PlayItem_Id with the arrow Sn1 shows a synchronization specification for a PlayItem, and sync_start_PTS_of_ PlayItem with the arrow Sn2 shows a time-point specification in the PlayItem on the PL time axis.

Playlist information of a BD-ROM is characterized by enabling multi-angle sections which allows for switching of multiple AVClips and also enabling definition of a synchronization section for synchronizing AVClip-SubClip. The above-mentioned Clip information and playlist information are classified as "static scenarios". This is because a PL, which is a static playback unit; is defined by the Clip information and playlist information. Thus concludes the description of the static scenarios.

"Dynamic scenarios" are explained next. A dynamic scenario is scenario data that dynamically defines playback controls of AVClips. Here, "dynamically" means that the contents of the playback controls change in response to a state change in the playback device or a key event generated by the user. In a BD-ROM, two modes are assumed for the operating environments of the playback controls. One is an operating environment fairly similar to that of a DVD playback device, and is a command-based execution environment. The other mode is an operating environment for Java Virtual Machines. The former of the two operating environments is called HDMV mode, and the latter is called BD-J mode. Since these two operating environments exist, a dynamic scenario is described for either one of the operating environments. A dynamic scenario for HDMV mode is called a Movie Object and defined by management information. On the other hand, a dynamic scenario for BD-J mode is called a BD-J Object.

First, a Movie Object is explained.

<Movie Object>

Figure 10:
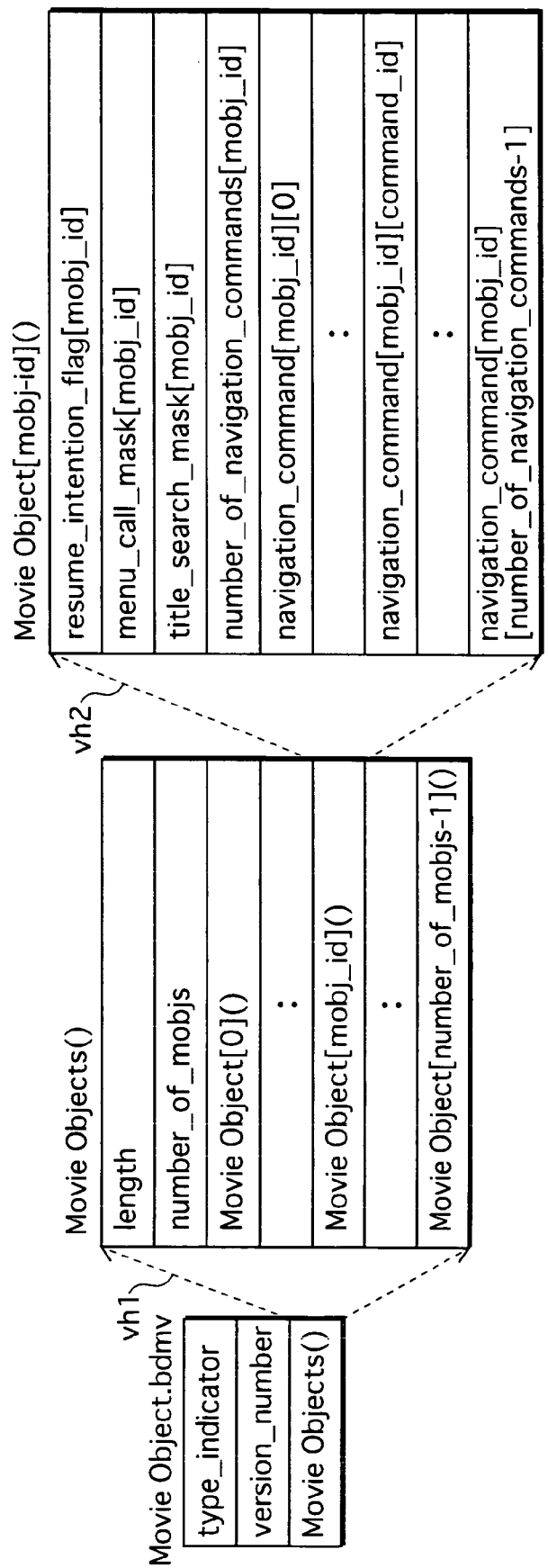
FIG. 10 shows an internal structure of a Movie Object.

A Movie Object is stored in a file called MovieObject.bdmv. FIG. 10 shows an internal structure of MovieObject.bdmv. MovieObject.bdmv is composed of "type_indicator" indicating a code string "MOBJ", "version_number" and "MovieObjects( )" that is one or more MovieObjects, as shown on the left side of the figure. The lead line vh1 shows the close detail of the internal structure of the MovieObjects. The MovieObjects( ) is composed of: "length" which is the data length of itself; "number_of_mobjs" which shows the counts of MovieObjects included therein; "MovieObject[0]( ) to [number_of_mobjs-1]( )" which are number_of_mobjs pieces of MovieObjects. These number_of_mobjs pieces of MovieObjects are identified by an identifier of mobj_id. The lead line vh2 in the figure shows the close detail of the internal structure of a given MovieObject[mobj_id] ( ) identified by the mobj_id identifier.

As shown by the lead line, the MovieObject is composed of: "resume_intention_flag" indicating, when a MenuCall is made, whether playback after the MenuCall is to be resumed; "menu_call_mask" which is information indicating whether to mask a MenuCall; "title_search_flag" indicating whether to mask a title search function; "number_of_navigation_command" which shows the counts of navigation commands; and number_of_navigation_command pieces of "navigation commands".

A navigation command string is composed of command strings achieving conditional branching, status register settings in the playback device, acquisition of a setting value for the status register and the like. The following shows commands that can be described in Movie Objects.

PlayPL Command

Format: PlayPL (First Argument, Second Argument)

The first argument is able to specify a PL for playback using the number of the playlist. The second argument is able to specify a playback start position using a PlayItem included in the PL, and a given time, a Chapter, and a Mark in the PL.

A PlayPL function specifying a playback start position on the PL time axis using a PlayItem is "PlayPLatCELL( )";

a PlayPL function specifying a playback-start position on the PL time axis using a Chapter is "PlayPLatChapter( )"; and a PlayPL function specifying a playback start position using time information is "PlayPLatSpecified Time( )".

JMP Command

Format: JMP Argument

The JMP command is a branch for discarding the current dynamic scenario during operation, and executing a branch-destination dynamic scenario specified by the argument. JMP commands include direct reference commands that specify branch-destination dynamic scenarios directly, and indirect reference commands that specify branch-destination dynamic scenarios indirectly.

Since the description format of navigation commands in a Movie Object is closely similar to that of navigation commands used in a DVD, disk contents on a DVD can be effectively transported to a BD-ROM. As to a Movie Object, there is prior art disclosed in a WO publication. For more detail, refer to the WO (World Intellectual Property Organization) publication.

WO Publication: WO 2004/074976

Thus concludes the description of a Movie Object. Next is described a BD-J Object.

<BD-J Object>

A BD-J Object is a BD-J mode dynamic scenario described in a Java programming environment.

Figure 11:
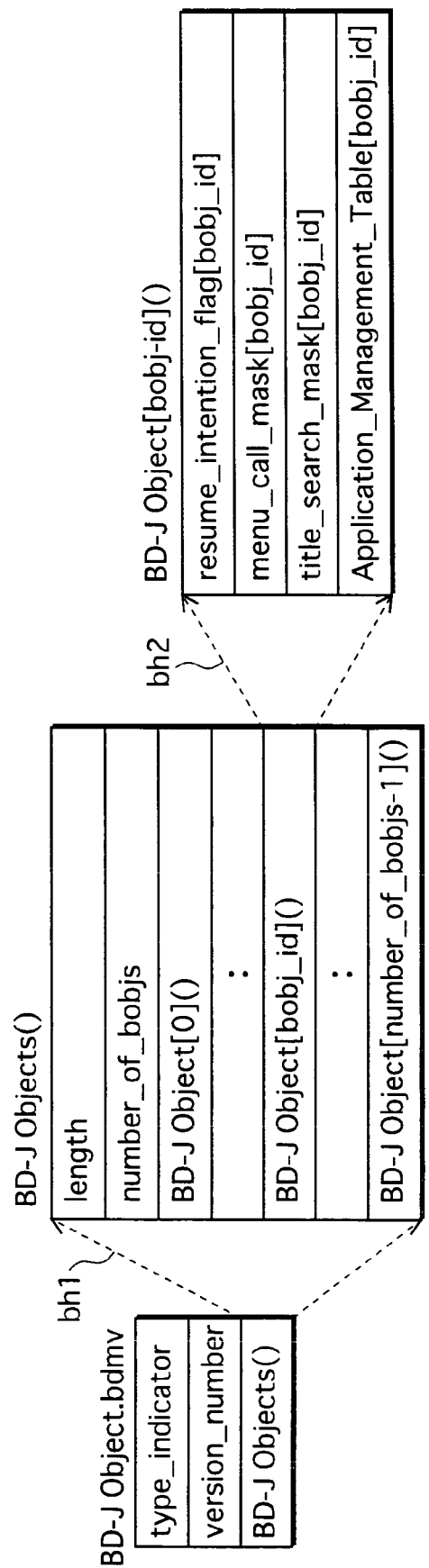
FIG. 11 shows an internal structure of a BD-J Object.

FIG. 11 shows the internal structure of BD-J Object.bdmv. BD-J Object.bdmv is, as shown on the left side of the figure, composed of: "type_indicater" indicating a code string "BOBJ"; "version_number"; and "BD-J Objects( )" which is one or more BD-J Objects. The lead line bh1 of the figure shows the close detail of the internal structure of BD-J Objects. The BD-J Objects( ) is composed of: "length" which is the data length of itself; "number_of_bobjs" which shows the counts of BD-J Objects included therein; "BD-J Objects" which are number_of_bobjs pieces of BD-J Objects. These number_of_bobjs pieces of BD-J Object are identified by an identifier of bobj_id. The lead line bh2 in the figure shows the close detail of the internal structure of a given BD-J Object [bobj_id] ( ) identified by the bobj_id identifier.

As indicated by the lead line, a BD-J Object is composed of "resume_intention_flag[bobj_id]", "menu_call_mask[bobj_id]", "title_search_flag[bobj_id]" and "Application_Management_Table[bobj_id]" as shown in the figure. A BD-J Object is substantially similar to a Movie Object in including "resume_intention_flag", "menu_call_mask" and "title_search_flag".

The difference from a Movie Object is that commands are not directly described in a BD-J Object. That is, in a Movie Object, the control procedure is directly written with navigation commands. On the other hand, in a BD-J Object, the control procedure is indirectly defined by writing a specification of a Java application on "Application_Management_Table[bobj_id]". According to such indirect definition, it is possible to provide efficient standardization of the control procedures of multiple dynamic scenarios.

Although PL playback of a MovieObject is achieved by description of a navigation command instructing PL playback (PlayPl command), the description can also be configured by incorporating a PL playback procedure into an application referred from an application management table.

Here, a Java application is described. A Java application is composed of one or more xlet programs loaded-onto a heap area (also called as a work memory) in a virtual machine. That is, the application consists of xlet programs and data loaded onto the work memory. Thus concludes the description regarding the structure of a Java application.

The entities of the Java applications are Java archive files (00001.jar and 00002.jar) stored in the BDJA directory under the BDMV directory in FIG. 2. The following explains Java archive files with reference to FIG. 12.

<Java Archive Files>

Figure 12A:
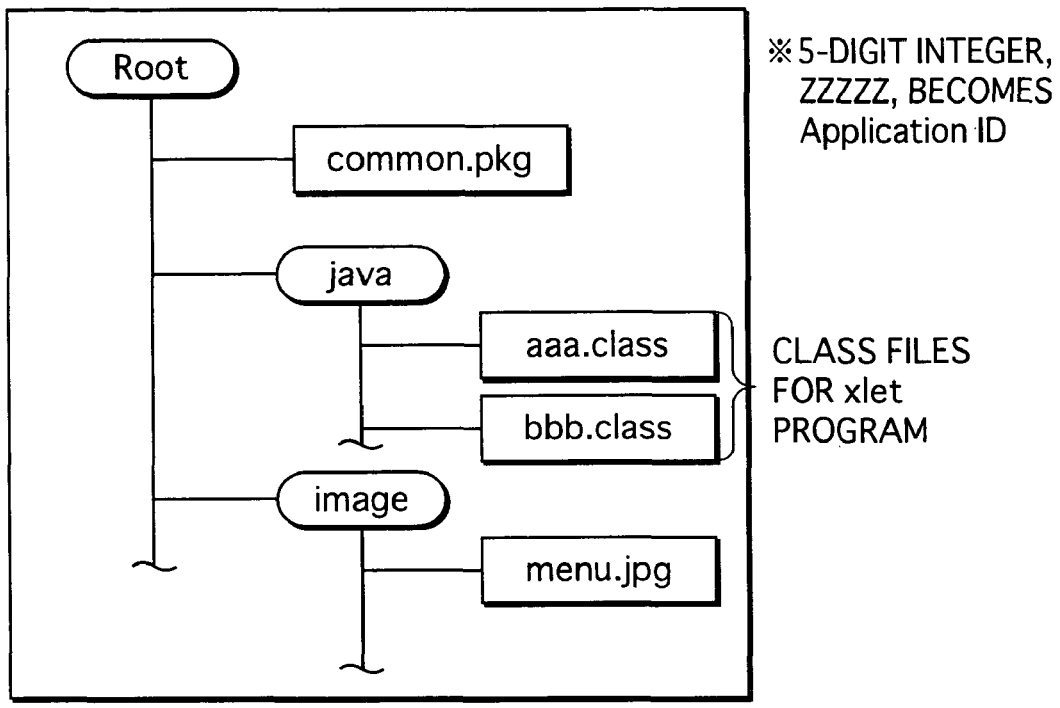
FIG. 12A shows programs and data stored in a Java archive file.

Each Java archive file (00001.jar and 00002.jar in FIG. 2) is a file obtained by combining at least one class file, at least one data file and the like. FIG. 12A shows programs and data stored in the archive file. The data in the figure is such that multiple files arranged in the directory structure shown in the box are combined by the Java archiver. The directory structure shown in the box includes a Root directory, a java directory and an image directory. common.pkg is placed in the Root directory, class files (aaa.class and bbb.class) are in the java directory, and menu.jpg is in the image directory. The java archive file is obtained by combining these by the Java archiver. These class files and data are expanded when read from a BD-ROM to cache, and are handled as multiple files placed in the directories in cache. A five-digit figure in the file name of a Java archive file, "zzzzz", indicates an application ID (applicationID). When a Java archive file is read to cache, programs and data of a given Java application can be obtained by referring to the figure of the file name.

The class files in the figure (aaa.class and bbb.class) are class files corresponding to the above-mentioned xlet programs. Playback procedures in BD-J mode are defined by xlet programs which correspond to instances of the class files.

xlet programs are Java programs that can use a JMF (Java Media FrameWork) interface, and conduct processes based on key events according to the JMF. Since the xlet programs can be processed in the JMF format, it is possible to instruct the playback device to perform playlist playback by generating an instance for a MPLS file (JMF player instance). In addition, by means of describing a function API call, the xlet programs are able to cause the BD-ROM playback device to perform processes unique to it.

Furthermore, xlet programs are capable of conduct procedures in which WWW sites are accessed and contents are downloaded. Herewith, innovative playback of works can be achieved where download contents and playlist playback are incorporated.

Figure 12B:
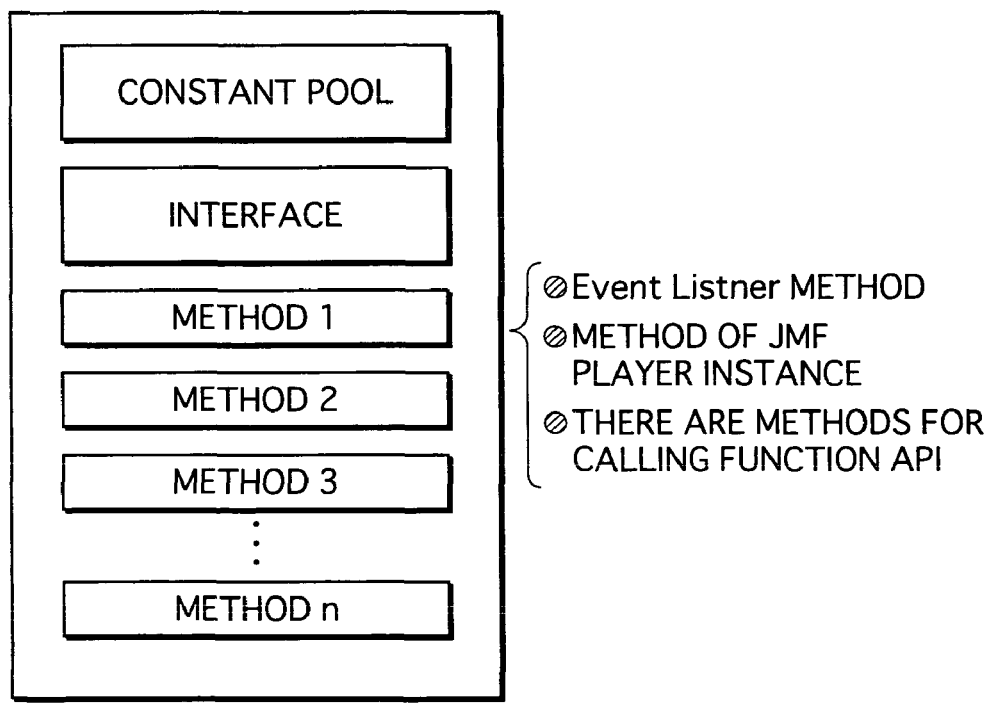
FIG. 12B shows an internal structure of a class file.

A class file of an xlet program is explained. FIG. 12B shows the internal structure of a class file. As shown in the figure, the class file is composed of "constant pool", "interface" and "methods 1, 2, 3 . . . , and n", similarly to a normal class file. There are different types of the methods of the class file: a method to which key events for triggering behaviors are preregistered (EventListner); a method instructing the JMF playback procedure (a method of JMF player instance); and a method to call a function API of the BD-ROM playback device. In these methods, calculations and other procedures are described using local variables assigned thereto and arguments for calling themselves. Thus concludes the description of Java archive files. Note here that, although programs and data constituting an application in the present embodiment are combined as a Java archive file, they may be combined as an LZH file or a zip file.

Since a description has been given of dynamic scenarios, next is described an example of a dynamic scenario to achieve parental control. FIG. 13 shows an example of a dynamic scenario for defining parental control.

The dynamic scenario includes multiple program parts to be exclusively executed according to the numeric value of PSR(20). PSR(2) is a status register that stores therein country information indicating a country where the playback device operates. The dynamic scenario of FIG. 13 includes: a program part pg1 which is executed when PSR(2) indicates a region such as the country of Japan; and a program part pg2 which is executed when PSR(2) indicates another region such as the United States. Of these two program parts, an example is given of the program part for Japan. The program part for japan includes two if-statement blocks (if-statement blocks 1 and 2) to be executed based on the value of PSR(13).

Here, PSR(13) is basically a read-only register, except in two cases. The first exceptional case relates to display of a setup menu. The setup menu is a menu for receiving environmental settings of the playback device. When the authentication of the user has been asserted by the user validation through the display of the setup menu, PSR(13) becomes rewritable.

The other exceptional case relates to the elapse of the time. Since an "age" is stored in PSR(13), PSR(13) is rewritten at the beginning of the year, or when the user's birthday separately set in the playback device comes around. In the second exceptional case, since PSR(13) is updated so as to increase, the above-mentioned if-statement of the dynamic scenario selects different PlayLists as playback PlayLists with the elapse of the time.

FIG. 14A shows how multiple PlayLists are played according to the dynamic scenario shown in FIG. 13. Here, assume that multiple PlayLists (PlayList#2, PlayList#3 and PlayList#4) that are playable in a mutually exclusive manner according to an if-statement block are Block 1, and that multiple PlayLists (PlayList#5 and PlayList#6) that are playable in a mutually exclusive manner according to an if-statement block 2 are Block 2. By the dynamic scenario of FIG. 13, the multiple PlayLists are played in the order of PlayList#1→PL Block 1 (PlayList#2, PlayList#3 or PlayList#4)→PL Block (PlayList#5 or PlayList#6)→PlayList#7, as shown in FIG. 14A.

For playback of the PL Block 1, any one of PlayList#2, PlayList#3 and PlayList#4 is played according to the value of PSR(13). Similarly, for playback of the PL Block 2, either one of PlayList#5 and PlayList#6 is played according to the value of PSR(13).

The if-statement Block 1 includes: PlayPL#4 to be executed when PSR(13) indicates 13 years old or younger; PlayPL#3 to be executed when PSR(13) indicates 18 years old or older; and PlayPL#2 to be executed when PSR(13) indicates 14 years of age or older but under the age of 18. According to the if-statement block, one of PLs#4, #3 and #2 is selectively played. On the other hand, the if-statement Block 2 includes: PlayPL#6 to be executed when PSR(13) indicates 13 years old or younger; and PlayPL#5 to be executed when PSR(13) indicates over 13 years old. The if-statement block enables one of PLs#6 and #5 to be selectively played.

FIG. 14B shows a summary of playback orders of PlayLists according to the value of PSR(13). The arrow (1) is a playback path with the value of PSR(13) indicating 0 year of age or older but under the age of 13. In this case, PlayLists are played in the order of PlayList#1→PlayList#4→PlayList#6→PlayList#7.

The arrow (2) is a playback path with the value of PSR(13) indicating 13 years of age or older but under the age of 18. In this case, PlayLists are played in the order of PlayList#1→PlayList#3→PlayList#5→PlayList#7. The arrow (3) is a playback path with the value of PSR(13) indicating 18 years old or older. In this case, PlayLists are played in the order of PlayList#1→PlayList#2→PlayList#5→PlayList#7.

Figure 14:
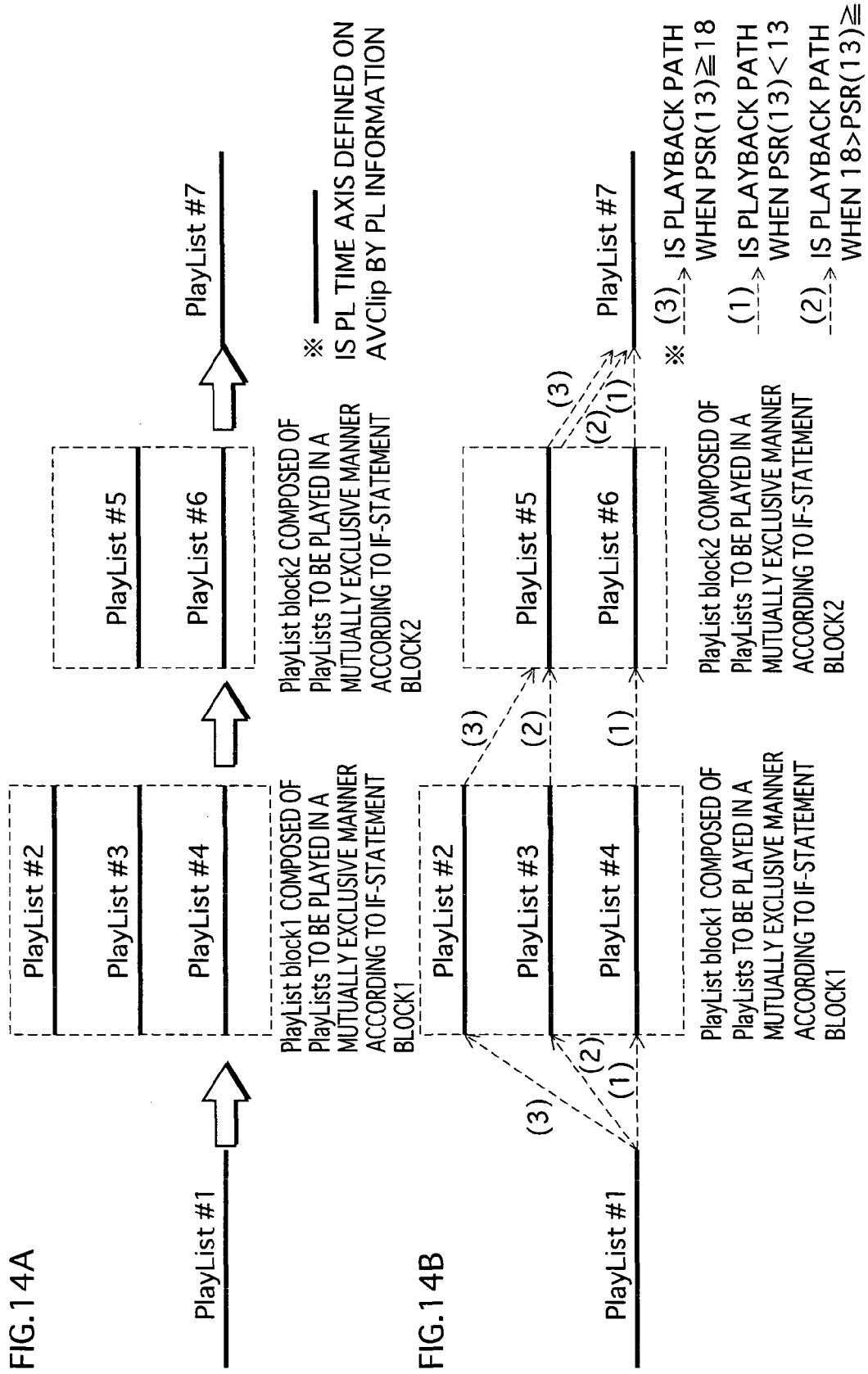
FIG. 14A shows how multiple PlayLists are played according to the dynamic scenario shown in FIG. 13.
FIG. 14B shows a summary of playback orders of PlayLists according to the value of PSR(13)
Figure 15:
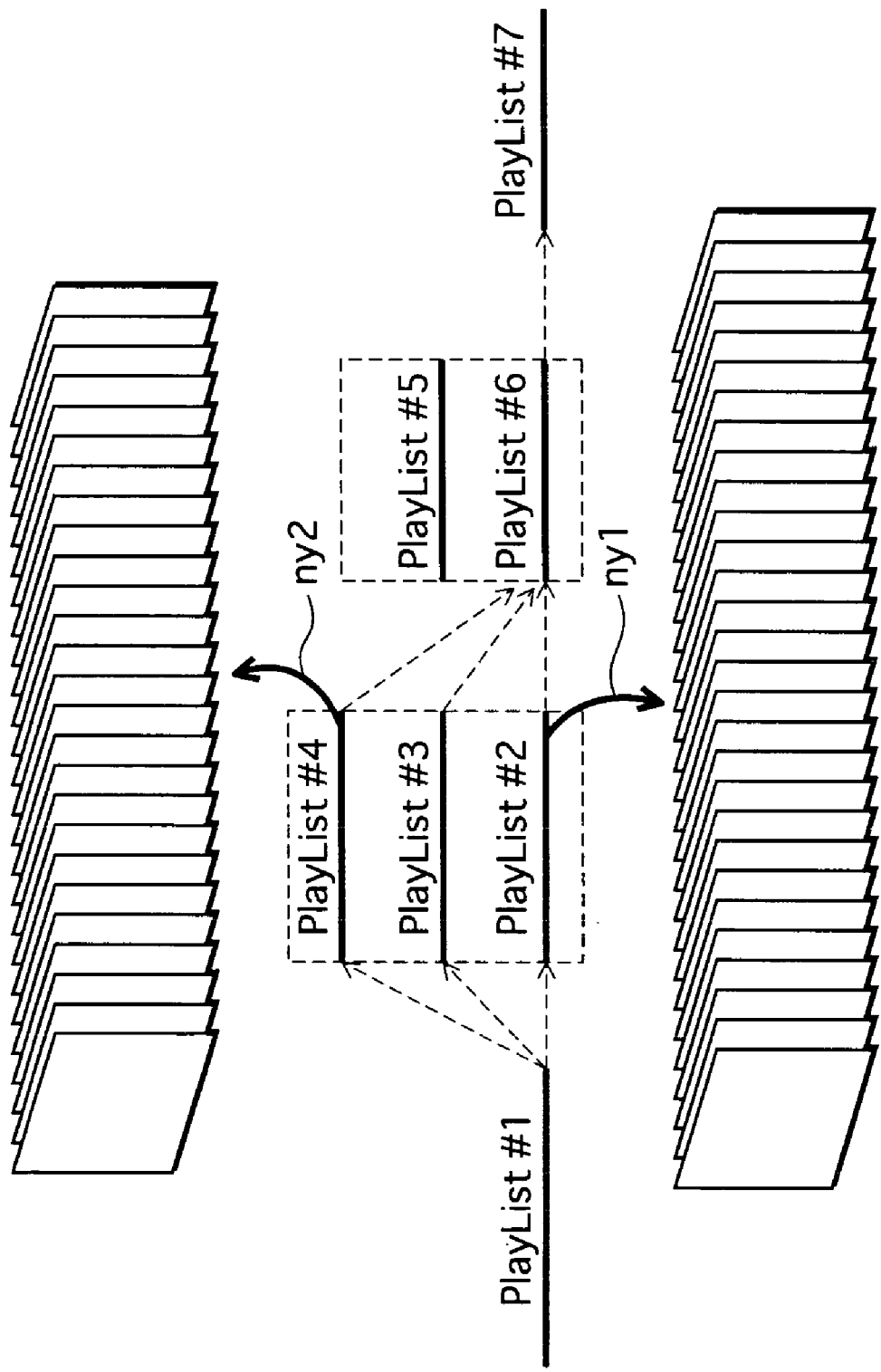
FIG. 15 is an example showing what videos are played according to switching of playback paths as shown in FIG. 14.

FIG. 15 is an example showing what videos are played according to switching of playback paths as shown in FIG. 14. Here, the lead lines ny1 and ny2 point to videos to be played by PlayList#2 and PlayList #4, respectively. Switching of playback paths as shown in FIG. 14B enables multiple scenes to be selectively played according to the setting of PSR(13) on the playback device. Thus concludes the description of dynamic scenarios.

<State Transition in BD-ROM>

Figure 16:
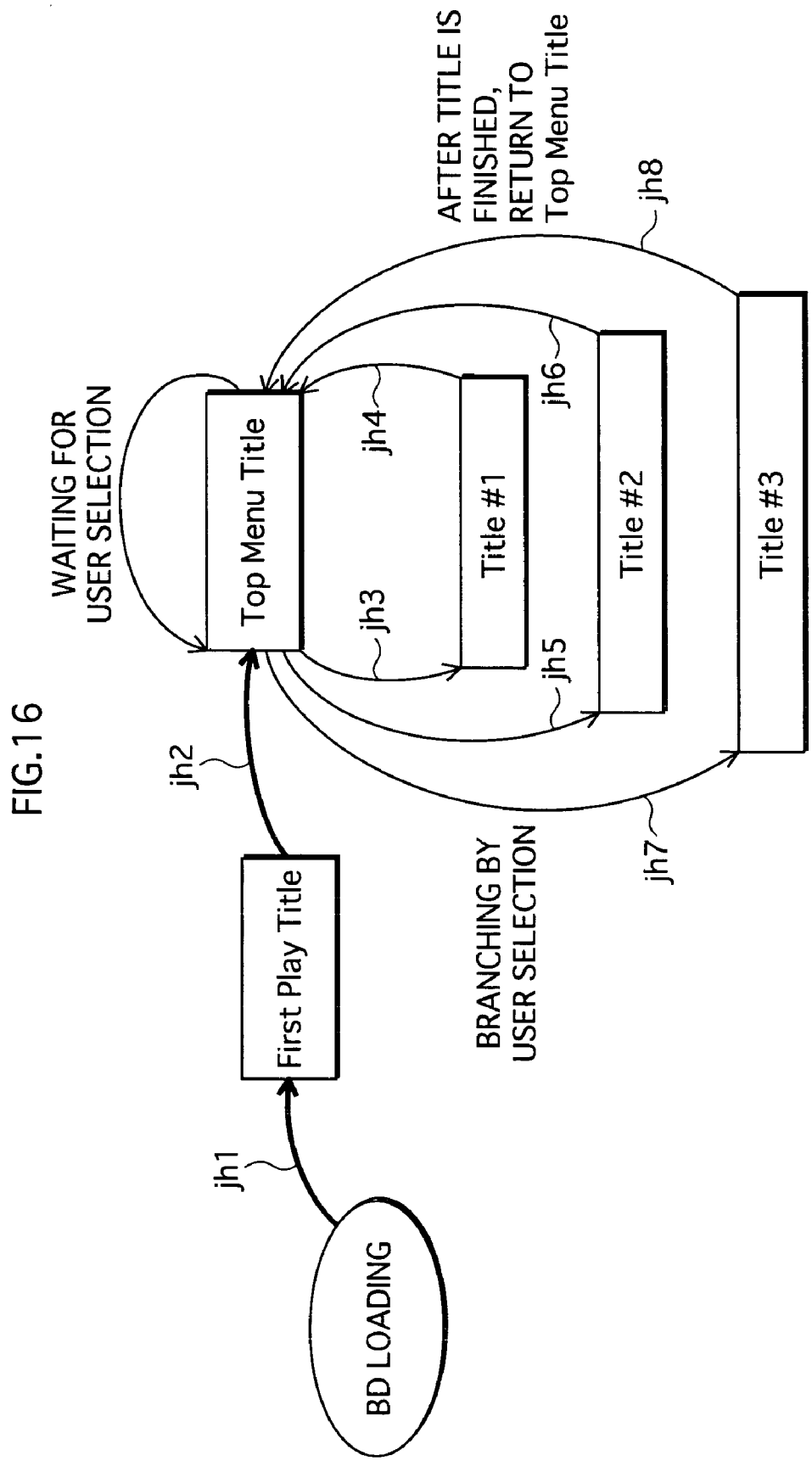
FIG. 16 shows state transition of disk contents.

The disk contents supplied on a read-only disk, like a DVD-Video, have a structure centering around the top menu. Unique state transition is made such that playback is performed by branching from the top menu to an individual copyrighted work, and subsequently TopMenu Title is brought up again. FIG. 16 shows state transition of disk contents. Each of the boxes in the figure indicates a Title, which is a playback unit corresponding to one "state" in the state transition unique to the disk contents. There are different types of Titles: "FirstPlayTitle" that is played at the beginning when a BD-ROM is being loaded; "Top_menuTitle" structuring Top-Menu; and a common "Title" other than the first two. The arrows jh1, jh2, jh3, jh4, jh5, jh6, jh7 and jh8 in the figure symbolically indicate branching among Titles. The state transition shown in the figure is such that "FirstPlayTitle" is played while a BD-ROM is being loaded, branching to "Top_menuTitle" occurs, and then a standby state, waiting for a selection on the top menu to be made, is brought about. In the industry of recording media for movie work distribution, such as BD-ROMs, it is a well-established practice to play a dynamic trademark during loading. A dynamic trademark is a distinctive representation of a maker or a distributor of the movie works, and FirstPlayTitle undertakes a role of playing the dynamic trademark first of all when the BD-ROM is loaded.

The state transition unique to the disk contents is that, when a selection operation on the menu is performed by the user, the process of playing an appropriate Title based on the selection and returning again to TopMenu Title is repeated endlessly until the BD-ROM is ejected.

Figure 17:
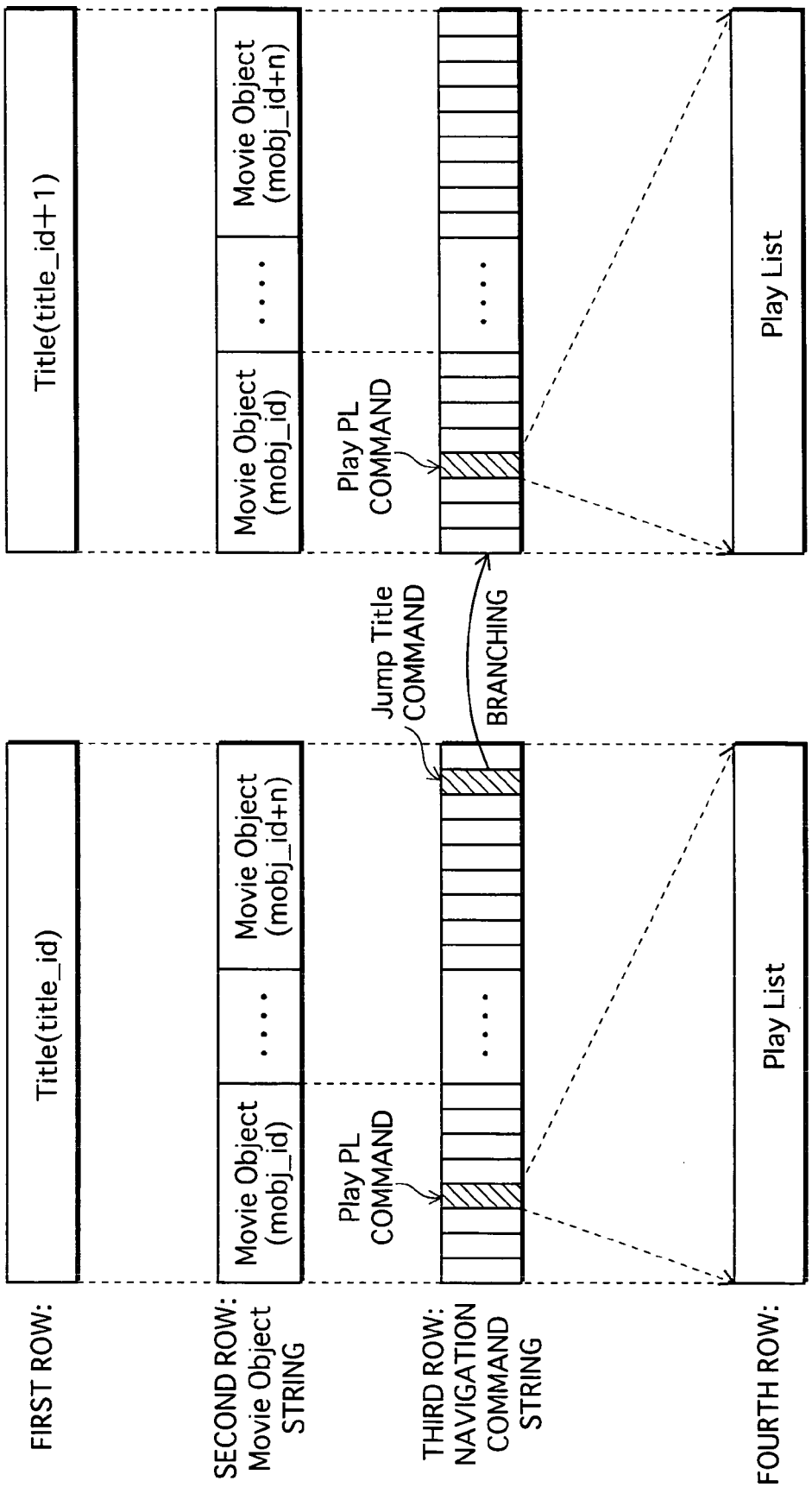
FIG. 17 shows Titles composed of HDMV-mode dynamic scenarios.

A Title achieving such state transition is composed of dynamic scenarios in HDMV-mode or in BD-J mode. FIG. 17 shows two Titles composed of HDMV-mode dynamic scenarios. The first row in the figure shows a given Title(title_id) which is identified by an identifier of title_id. The second row shows a MovieObject string made up of one or more MovieObjects that constitutes the Title. The third row shows navigation commands constituting the MovieObjects.

Branching from a Title to another Title as shown in FIG. 16 is achieved by describing, in a MovieObject, a navigation command instructing the playback device to Jump to the other Title (JumpTitle command). In addition, a PL shown in the fourth row of the figure is made to belong to the Title by describing, in the MovieObject, a navigation command instructing the playback device to perform playback of the PL (PlayPL command).

By making the PL belong to the Title, the Title in HDMV mode is able to define a movie work involving video playback. Thus concludes the structure of a Title defined by HDMV-mode dynamic scenarios.

Figure 18:
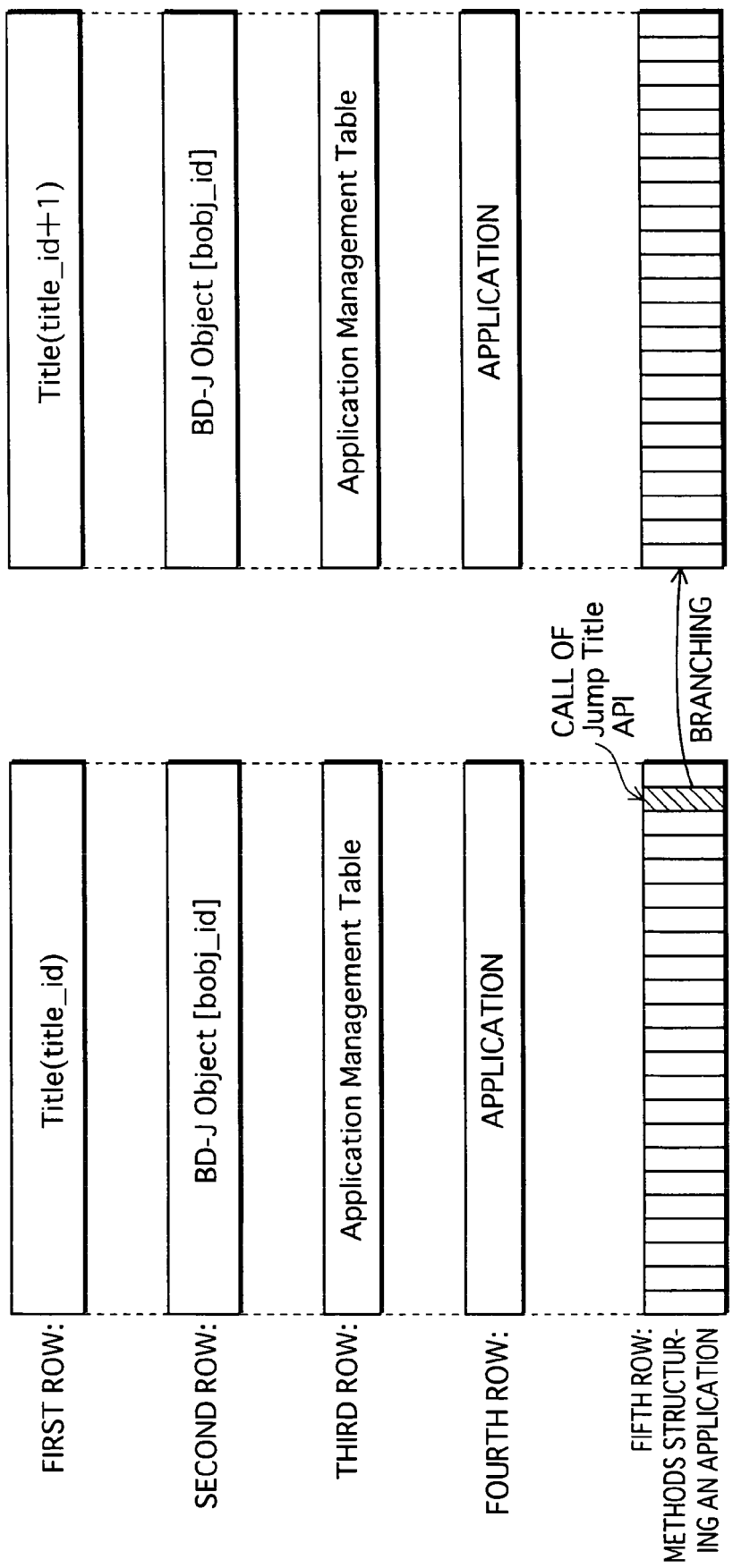
FIG. 18 shows internal structures of Titles composed of BD-J-mode dynamic scenarios (BD-J Objects)

Next is described the internal structure of a Title structured by a dynamic scenario in BD-J mode. FIG. 18 shows the internal structure of Titles composed of BD-J-mode dynamic scenarios (BD-J Objects).

The first row shows a given Title identified by an identifier of title_id, and the second row shows only one BD-J Object structuring the Title. The third row shows an application management table located inside the BD-J Object. The fourth row shows an application to be operated by the application management table in the third row. Since this application includes a method instructing the playback device to Jump to another Title (a method to call JumpTitleAPI), as shown in the fifth row, branching to the other Title shown in FIG. 16 is achieved by the JumpTitleAPI call method. As to the fourth row, a PL is played together with the execution of the application. According to the definition of the application operation above, a Title involving only a control procedure without PL playback is defined.

As to the internal structure of a Title described above, it is index.bdmv, shown in FIG. 2, that defines which MovieObjects become components of a given Title, or which BD-J Object becomes a component of a given Title. The following describes index.bdmv.

index.bdmv is a table showing Movie Objects or BD-J Objects that structure Titles.

Figure 19:
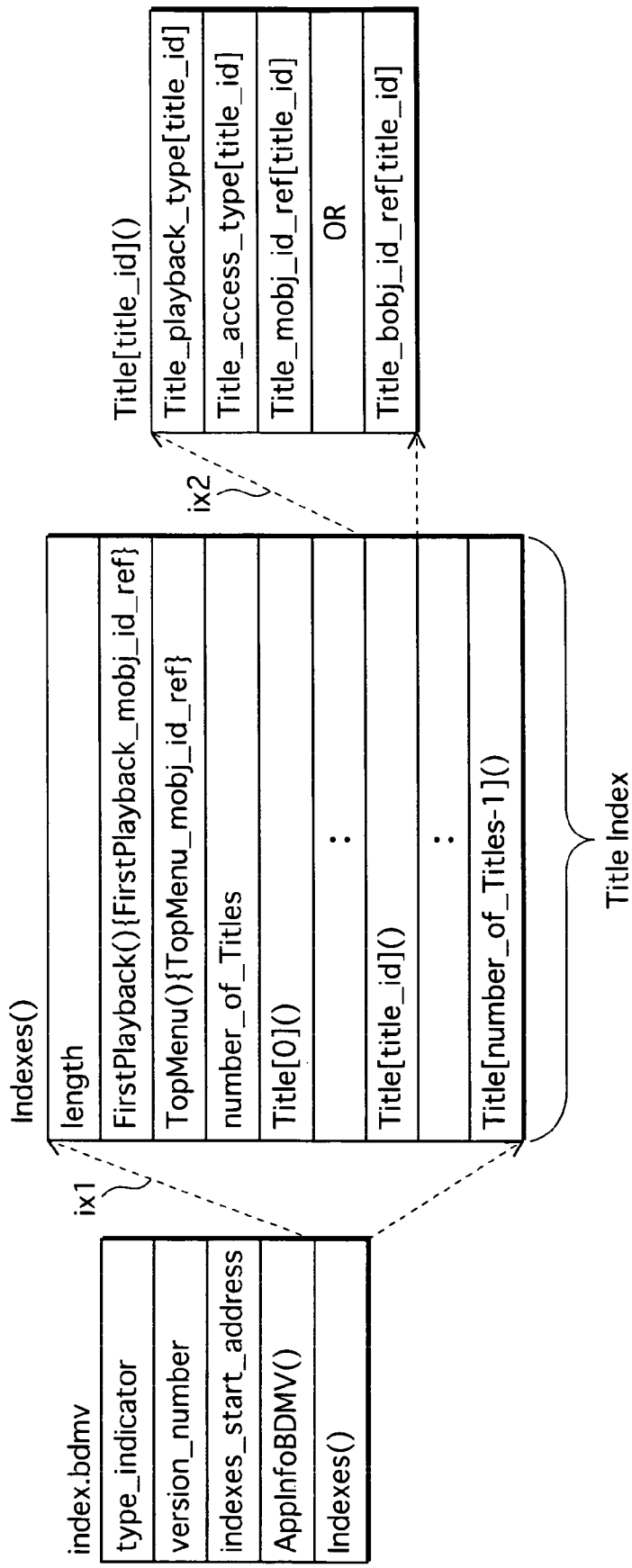
FIG. 19 shows an internal structure of index.bdmv.

FIG. 19 shows the internal structure of index.bdmv. index.bdmv is, as shown in the figure, composed of: "type_indicator" having a value indicating "INDX"; "version_number"; "Indexes_start_address" indicating a relative address from the beginning of this file to Indexes; and "Indexes( )". "Indexes" are indexes for respective Titles, and composed of "length", "FirstPlayback( ){FirstPlayback_mobj_id_ref}", "TopMenu( ){TopMenu_mobj_id_ref}", "number_of_Titles" and "Title[0]( )~Title[number_of_Titles−1]( )", as the dotted lead line ix1 shows the close detail.

"FirstPlayback( ){FirstPlayback_mobj_id_ref}" is an Index for FirstPlayTitle, and stores therein a reference value (FirstPlayback_mobj_id_ref) of a MovieObject identifier structuring FirstPlayTitle.

"TopMenu( ){TopMenu_mobj_id_ref}" is an Index for Top-MenuTitle, and stores therein a reference value (Top-Menu_mobj_id_ref) of a MovieObject identifier structuring Top_menuTitle.

"Title[0]( )~Title[number_of_Titles−1]( )" are Indexes for Titles other than the FirstPlayTitle and Top-MenuTitle, and there are number_of_Title pieces of Titles. These Titles are identified by the identifier, title_id.

Here, assume that an index identified by the identifier title_id is Title[title_id] ( ). The lead line ix2 in the figure shows the close detail of the internal structure of Title[title_id]( ).

As shown in the figure, "Title[title_id]( )" is composed of: "Title_Playback_Type[title_id]" indicating a type of playback of the Title, such as indicating whether "Title[title_id]" has branching; "Title_access_Flag [title_id]" indicating whether the execution of the search function for the Title is allowed; and "title_mobj_id_ref[title_id]" uniquely indicating MovieObjects structuring the Title. Here, when the dynamic scenario structuring the Title is a BD-J Object, "title_mobj_id_ref[title_id]" is replaced with "title_bobj_id_ref[title_id]". "title_bobj_id_ref[title_id]" uniquely indicates the BD-J Object structuring the Title.

Thus concludes the description of the recording medium. The following explains the playback device of the present invention.

Figure 20:
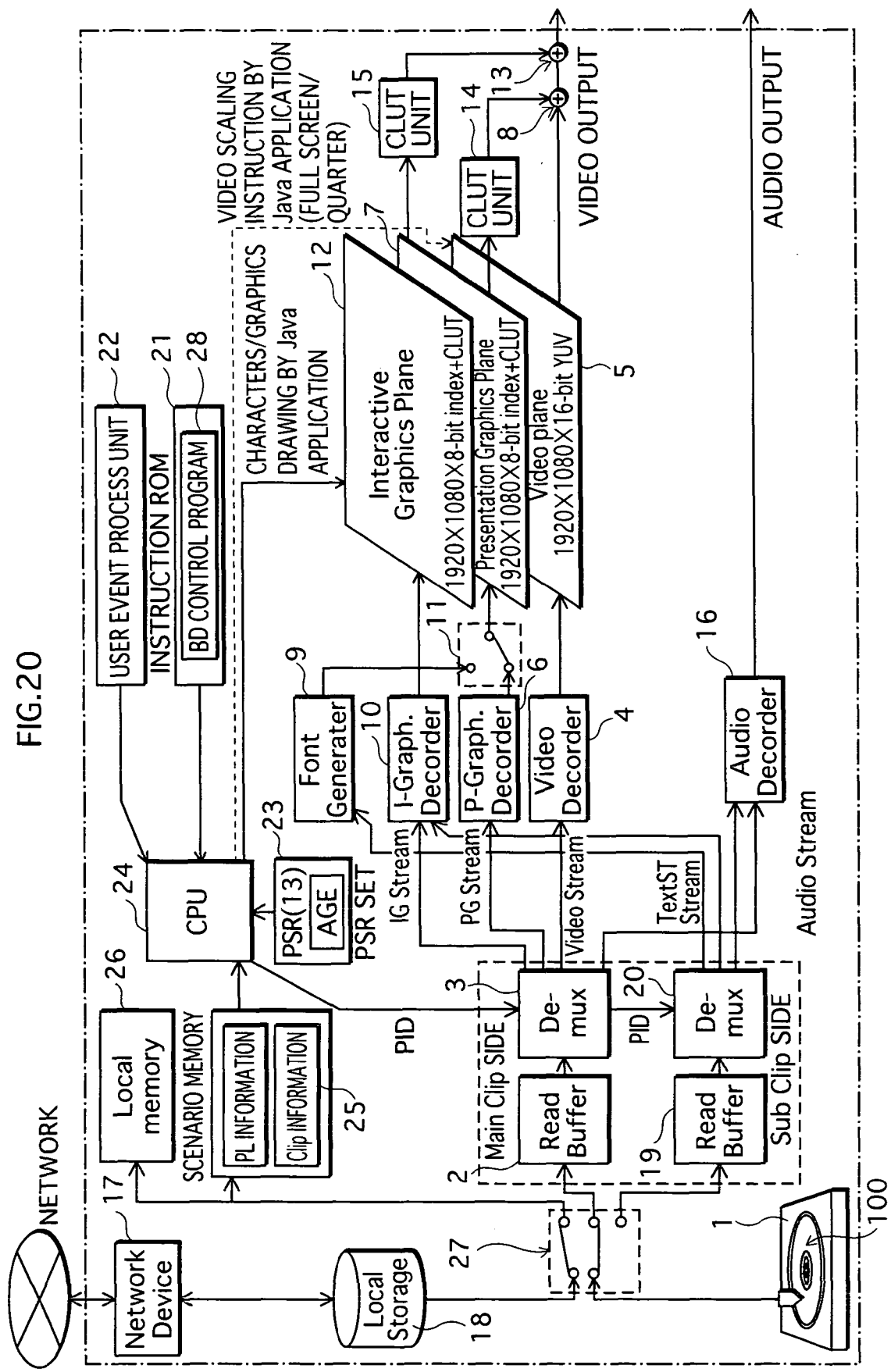
FIG. 20 shows an internal structure of a playback device of the present invention.

FIG. 20 shows the internal structure of the playback device of the present invention. The playback device of the present invention is commercially manufactured based on the internal structure shown in the figure. The playback device of the present invention is mainly composed of two parts—system LSI and a drive device, and can be produced commercially by mounting these parts on the cabinet and substrate of the device. The system LSI is an integrated circuit in which various processing units for carrying out functions of the playback device are incorporated. The playback device manufactured in this way comprises: a BD-ROM drive 1; a read buffer 2; a demultiplexer 3; a video decoder 4; a video plane 5; a P-Graphics decoder 6; a Presentation Graphics plane 7; a composing unit 8; a font generator 9; an I-Graphics decoder 10; a switch 11; an Interactive Graphics plane 12; a composing unit 13; a CLUT unit 14; a CLUT unit 15; an audio decoder 16; a Network Device 17; a Local Storage 18; a read buffer 19; a demultiplexer 20; an instruction ROM 21; a user event process unit 22; a PSR set 23; a CPU 24; a scenario memory 25; a local memory 26; a switch 27 and a BD-ROM control program 28.

The components related to AVClip playback stored in a BD-ROM (the BD drive 1—the audio decoder 16) are explained first.

The BD-ROM drive 1 loads/ejects a BD-ROM, and executes access to the BD-ROM.

The read buffer 2 is a FIFO memory, and TS packets read from the BD-ROM are stored therein in a first-in first-out manner.

The demultiplexer (De-MUX) 3 takes out TS packets from the read buffer 2, and converts the TS packets into PES packets. Then, the demultiplexer 3 outputs, among the PES packets obtained by the conversion, ones with PID set by the CPU 24 to any one of the video decoder 4, the P-Graphics decoder 6, the I-Graphics decoder 10 and the audio decoder 16.

The video decoder 4 decodes multiple PES packets output from the demultiplexer 3, obtains uncompressed pictures and writes the pictures to the video plane 5.

The video plane 5 is a plane for storing therein uncompressed pictures. A plane is a memory area of the playback device for storing pixel data of a single screen capacity. The resolution of the video plane 5 is 1920×1080, and the picture data stored in the video plane 5 is composed of pixel data represented by a 16-bit YUV. On the video plane 5, scaling can be performed on playback video for each frame of a video stream. Scaling is to change a playback image for each frame into either ¼ (a quarter) or 1/1 (full scale) of the entire video plane 5. Such scaling is executed in BD-J mode according to instruction from the CPU 24, which thereby allows for screen presentations such as moving the playback images of the video stream to a corner of the screen and bringing up the playback images in full screen.

The P-Graphics decoder 6 decodes a presentation graphics stream read from a BD-ROM and writes the uncompressed graphics to the Presentation Graphics plane 7. The subtitle appears on the screen by decoding the graphics stream.

The Presentation Graphics plane 7 is a memory having a single screen capacity area, and is able to store therein uncompressed graphics of a single screen capacity. The resolution of the plane is 1920×1080, each pixel of the uncompressed graphics in the Presentation Graphics plane 7 is expressed by an 8-bit index color. By converting such index colors using a CLUT (Color Lookup Table), the uncompressed graphics stored in the Presentation Graphics plane 7 are used for display.

The composing unit 8 composes uncompressed picture data (i) stored in the video plane 5 with the contents stored in the Presentation Graphics plane 7.

The font generator 9 converts text codes included in a textST stream into bitmap format using character fonts, and writes the result in the Presentation Graphics plane 7.

In HDMV mode, the I-Graphics decoder 10 decodes an IG stream read from a BD-ROM or the Local Storage 18, and writes the uncompressed graphics to the Interactive Graphics plane 12.

The switch 11 is a switch for selectively writing to the Presentation Graphics plane 7 either a font string generated by the font generator 9 or graphics obtained by decode processing of the P-Graphics decoder 6.

To the Interactive Graphics plane 12, uncompressed graphics obtained by decode processing of the I-Graphics decoder 10 are written. In BD-J mode, characters and graphics drawn by an application are also written to the Interactive Graphics plane 12.

The composing unit 13 composes the storage contents of the Interactive Graphics plane 12 and composite images output from the composing unit 8 (composites made by composing uncompressed picture data and the storage contents of the Presentation Graphics plane 7). Such composition allows for displaying uncompressed picture data on top of which characters and graphics written, to the I-Graphics decoder 10 by the application are overlaid.

The CLUT unit 14 converts, into Y, Cr, and Cb values, index colors of uncompressed graphics stored in the Presentation Graphics plane 7.

The CLUT unit 15 converts, into Y, Cr, and Cb values, index colors of uncompressed graphics stored in the Interactive Graphics plane 12.

The audio decoder 16 decodes PES packets output from the demultiplexer 3 and outputs uncompressed audio data.

Thus concludes the components related to AVClip playback. The components related to operations in BD-J mode (Network Device 17 to De-mux 20) are explained next.

The Network Device 17 conducts the communication function of the playback device, and establishes a TCP connection, an FTP connection or the like to the web site of a URL when being in BD-J mode and if receiving the URL specification from a Java application. Such connection establishment enables a Java application to perform download from a web site.

The Local Storage 18 is a hard disk for therein storing, together with metadata, contents supplied by communication media and recording media other than BD-ROMs—such as contents downloaded from web sites via connections established by the Network Device 17. The metadata is information for managing download contents by binding them to the Local Storage 18. By accessing the Local Storage 18, an application in BD-J mode is able to perform various processes using the download contents.

The read buffer 19 is a FIFO memory, and stores, when a SubClip is included in the download contents stored, in the Local Storage 18, TS packets structuring the SubClip in a first-in first-out manner.

The demultiplexer (De-MUX) 20 takes out TS packets from the read buffer 19 and converts the TS packets into PES packets. Then, the De-MUX 20 outputs, among the converted PES packets, ones with desired PIDs to the font generator 9, the I-Graphics decoder 10 and the audio decoder 16.

With the Network Device 17 to De-mux 20, the contents that a Java application downloaded via a network can be played back similarly to the contents recorded on a BD-ROM. Next are described the components for achieving integration control in the playback device (the instruction ROM 21 to BD-ROM control program 28).

The instruction ROM 21 stores therein software that defines control of the playback device (the BD-ROM control program 28).

The user event process unit 22 outputs a user event to the CPU 24 according to a key operation on the remote controller or on the front panel of the playback device.

The PSR set 23 is a built-in register of the playback device, and is realized by a nonvolatile memory. The state control unit 23 is made up of 64 Player Status Registers (PSR) and 4096 General Purpose Registers (GPR). PSR(13) storing therein a numeric value representing ages and PSR(20) storing therein country information are examples of PSRs of the state control unit 23. Among the setting values of the Player Status Registers (PSR), PSR4 to PSR8 are used for describing the current playback point of time.

When set to a value in the range of 1 to 100, PSR4 indicates a title to which the current playback time point belongs. When set to 0, PSR4 indicates that the current playback time point belongs to the top menu.

PSR5, when set to a value in the range of 1 to 999, indicates a chapter number to which the current playback time point belongs. When set to 0xFFFF, PSR5 indicates that the chapter number is invalid in the playback device.

PSR6, when set to a value in the range of 1 to 999, indicates a number of a PL to which the current playback time point belongs (a current PL).

PSR7, when set to a value in the range of 0 to 255, indicates a number of a PlayItem (current Play Item) to which the current playback time point belongs (a current Play Item).

PSR8, when set to a value in the range of 0 to 0xFFFFFFFF, indicates the current playback time point (current PTM (Presentation TiMe)) using a time accuracy of 45 KHz. PSR4 to PSR8 above identify where on the time axis of the entire BD-ROM in FIG. 21A the current playback time point is located.

The CPU 24 executes software stored in the instruction ROM 21 and implements control of the entire playback device. The contents of the control dynamically change according to a user event output from the user event process unit 22 and a setting value of each PSR in the PSR set 23.

The scenario memory 25 is a memory for storing current PL information and current Clip information. The current PL information is, among plural pieces of PL information recorded on a BD-ROM, a PL information piece currently targeted for processing. The current Clip information is, among plural pieces of Clip information recorded on a BD-ROM, a Clip information piece currently targeted for processing.

The local memory 26 is a cache memory for temporarily storing the contents recorded on a BD-ROM since reading from a BD-ROM is performed at a slow speed. Owing to that the local memory 26 is provided, the execution of an application in BD-J mode is made more efficient.

The switch 27 is a switch for putting various data read from a BD-ROM and the Local Storage 18 selectively into one of the read buffer 2, read buffer 19, scenario memory 25 and local memory 26.

Thus concludes a hardware structure of the playback device of the present embodiment. Next is described a software structure of the playback device of the present embodiment.

Figure 21:
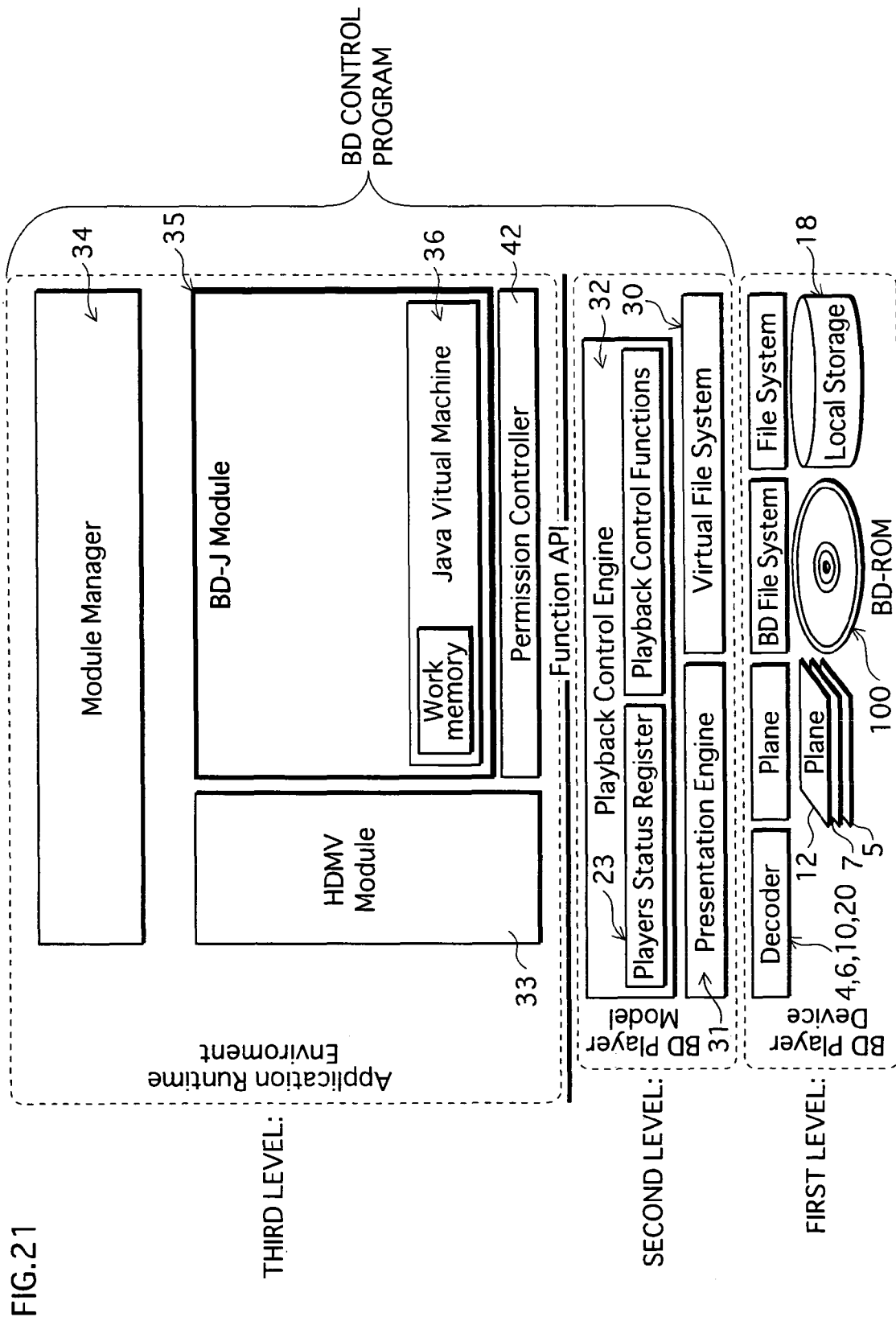
FIG. 21 shows software stored in a ROM 21 and hardware, which are depicted in a layer model.

FIG. 21 shows software and hardware components contained in the ROM 21, which are depicted in a layer model. The layer model of the playback device is composed of a), b) and c) below, as shown in the figure:

a) First Level: BD Player Device;
b) Second Level: BD Player Model; and
c) Third Level: Application Runtime Environment.

The BD-ROM control program 28 stored in the instruction ROM 21 realizes, within the layer model, a) Third Level of the Application Runtime Environment and b) Second Level of the BD Player Model.

Figure 32:
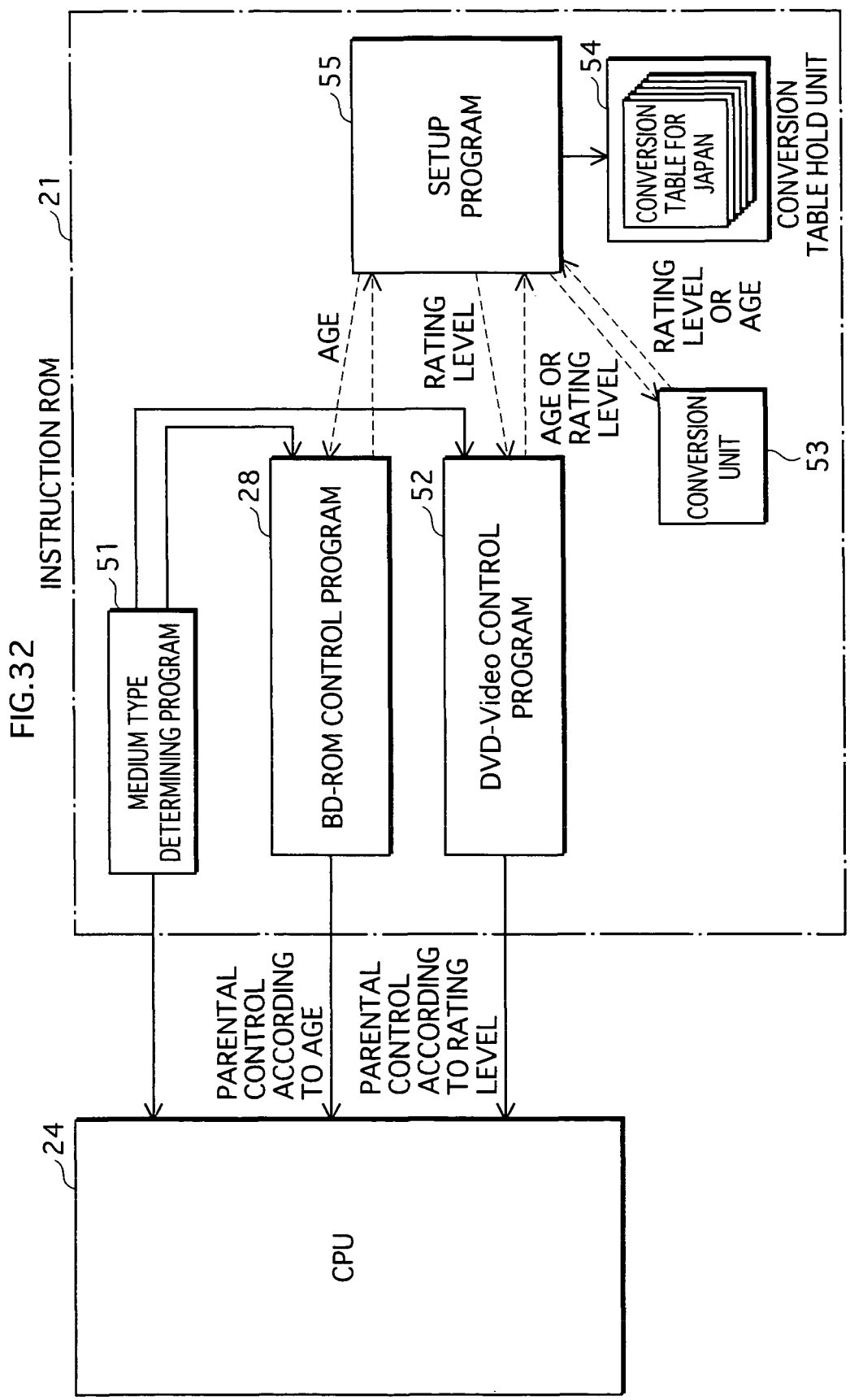
FIG. 32 shows storage contents of the instruction ROM 21, which is depicted in a similar manner to FIG. 28.

Among these levels, the hardware structure of the playback device shown in FIG. 32 belongs to First Level. The BD Player Device of First Level in the figure includes, out of the hardware components shown in FIG. 32: "decoders" composed of the video decoder 4, the P-Graphics decoder 6, the I-Graphics decoder 10 and the audio decoder 16; "planes" composed of the video plane 5, the Presentation Graphics plane 7 and the Interactive Graphics plane 12; a BD-ROM and the file system thereof; and the Local Storage 18 and the file system thereof.

Second Level of "BD Player Model" is composed of the levels b1) and b2) below. That is, b2) Level of a Playback Control Engine 32; and
b1) Level of a Virtual File System 30 and a Presentation Engine 31. Second Level offers function APIs to the upper levels.

The Virtual File System 30 to the module manager 34 belonging to Second Level are described next.

The virtual File System 30 is a virtual file system for integrally handling the download contents stored in the Local Storage 18 and the disk contents of a BD-ROM. Here, the download contents stored in the Local Storage 18 include SubClip, Clip information and playlist information. The playlist information included in the download contents is different from the playlist information of a BD-ROM in being able to specify Clip information of either the BD-ROM or the Local Storage 18. To make such specification, the playlist information of the Virtual File System 30 need not specify a file on the BD-ROM or the Local Storage 18 with a full path name. This is because the file system of the BD-ROM and that of the Local Storage 18 are recognized as a single virtual file system (Virtual File System 30). Accordingly, Clip_Information_file_name of PlayItem information and Clip_Information_file_name of SubPlayItem information are able to specify Avclips on the BD-ROM via the Virtual File System 30 by specifying five-digit values, which are file bodies of the files storing the Clip information. By reading the contents recorded on the Local Storage 18 via the Virtual File System 30 and dynamically combining the read contents and the contents recorded on the BD-ROM, it is possible to create a wide range of playback variations. The disk contents formed by combining the Local Storage 18 and the BD-ROM are handled on an equal basis as the disk contents of the BD-ROM, and therefore, the "BD-ROM" of the present application shall include a virtual recording medium formed by combining the Local Storage 18 and a BD-ROM.

The Presentation Engine 31 executes AV playback functions. The AV playback functions in the playback device consist of a conventional function group similar to that found in DVD and CD players, such as starting playback (Play); stopping playback (Stop); pausing (Pause-On); releasing a pause (Pause-Off); releasing a still (Still-Off); speed specified fast-forwarding (Forward Play (speed)); speed specified fast-rewinding (Backward Play (speed)); changing audio settings (Audio Change); changing subtitle settings (Subtitle Change); and changing angle settings (Angle Change). In order to realize the AV playback functions, the Presentation Engine 31 controls the video decoder 4, P-graphics decoder 6, I-Graphics decoder 10 and audio decoder 16 so as to decode, within AVClips read to the read buffer 2, a portion corresponding to a desired time. Decoding a portion corresponding to a desired time, which is indicated by PSR8 (current PTM), enables playback of a given time point of an AVClip.

The playback control engine (Playback Control Engine (PCE)) 32 executes various functions, such as playback control functions for playlists (i) and state acquisition/setting functions for the PSR set 23 (ii). The playback control functions for PLs involve causing the Presentation Engine 31 to carry out, among the AV playback functions performed by the Presentation Engine 31, the functions of playback start and playback stop according to the current PL information and Clip information. These functions (i) and (ii).are executed according to function calls from the HDMV module 33 and the BD-J module 35.

That is, when a function call instructing PL playback is made, the Playback Control Engine 32 reads playlist information of the playback target, from the BD-ROM or the Local Storage 18 via the Virtual File System 30. The Playback Control Engine 32 refers to the PlayItem information within the read playlist information, and reads the Clip information described in Clip_Information_file_name of the PlayItem information from the BD-ROM or the Local Storage 18 via the Virtual File System 30.

Third Level of "Application Runtime Environment" is composed of the levels c1) and c2) below. That is, c1) Level on which the Module Manager 34 is present; and
c2) Level on which the HDMV module 33 and the BD-J module 35 are present. In the layer model of FIG. 33, the module manager 34 is located on the highest level.

The HDMV module 33 is the main execution body of the HDMV mode. When the module manager 34 makes an activate request (activate(mobj_id)) that specifies a branch destination MovieObject by mobj_id, the HDMV module 33 reads MovieObject(mobj_id) into the local memory 26, decodes navigation commands described in the Movie Object, and executes a function call to the Playback Control Engine 32 based on the result of the decoding.

The module manager 34 holds Index.bdmv read from a BD-ROM and performs branch control. The branch control is made by issuing a Terminate event to a dynamic scenario constituting the current title and by issuing an Activate event to a dynamic scenario constituting the branch-destination title. In the case that MovieObject executes a JumpTitle command (JumpTitle(title_id)) specifying title_id, the module manager 34 issues a Terminate event to MovieObject constituting the current title while issuing an activate(mobj_id) event to activate Movie Object constituting a title corresponding to title_id.

The BD-J module 35 is a so-called Java platform, which causes a Java Virtual Machine to execute methods making up an application.

The permission controller 36 performs, when an application has made a request of PL playback, two-way authentication with the application and judges whether the requester application has a right to perform the PL playback. If the application is entitled, the permission controller 36 requests the Playback Control Engine 32 to carry out the playback. If not, the permission controller 36 outputs, to the requester application, a reply event indicating no permission. According to this permission judgment by the Permission Controller 42, even if an application distributed by a distribution company requests PLs distributed by another distribution company, such a request would not be allowed. Therefore, it is possible to prevent an application having no authorization from using the PLs.

Figure 22:
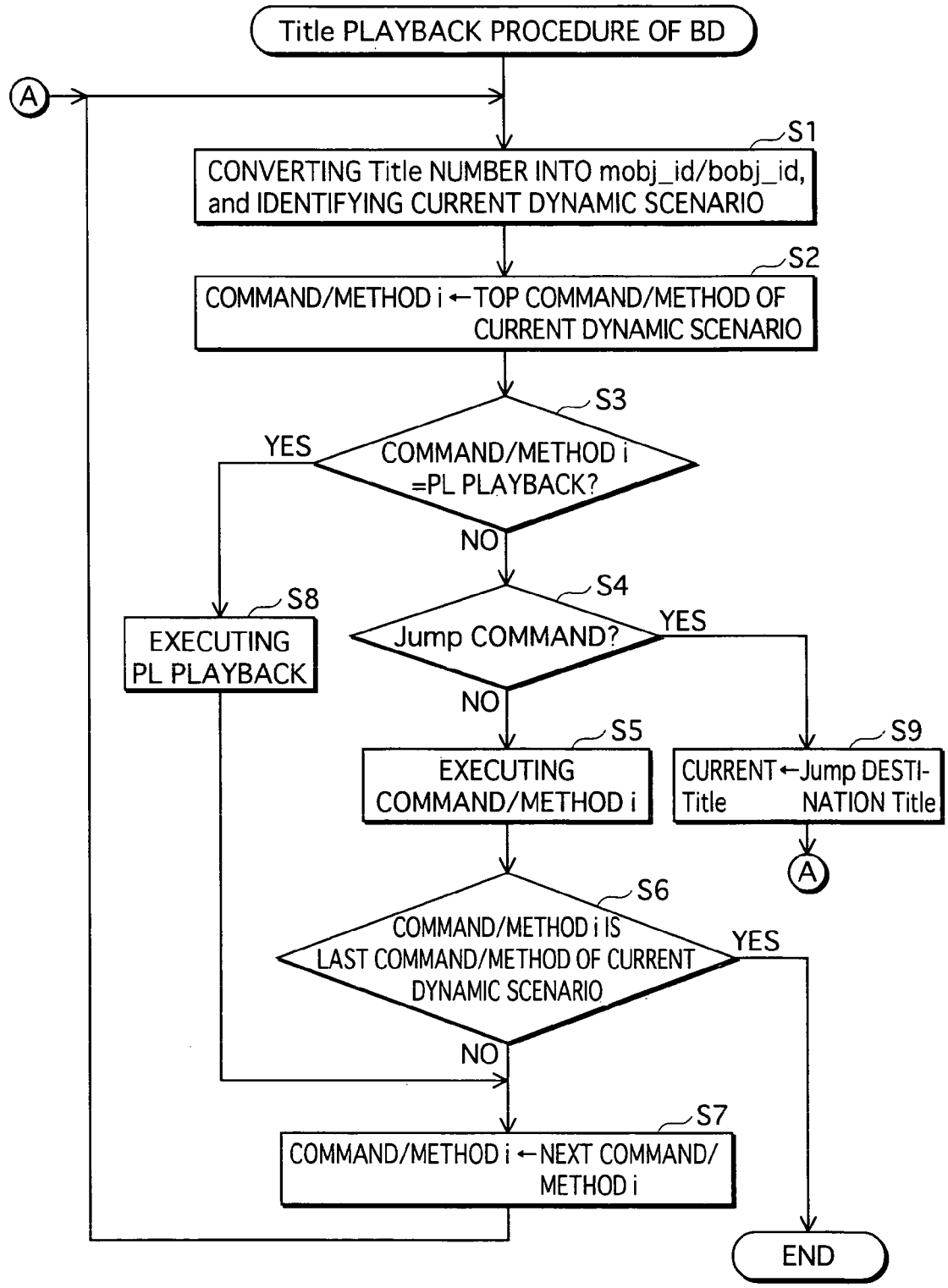
FIG. 22 is a flowchart showing process procedures of an HDMV module 33 and a BD-J module for playing a title.

FIG. 22 is a flowchart showing process procedures of the HDMV module 33 and BD-J module 35 for playing a title. A title playback procedure in a BD-ROM is described next with reference to the flowchart. In the flowchart, among multiple dynamic scenarios recorded on a BD-ROM, a scenario targeted for the process is called a current dynamic scenario. Command/Method i means, among navigation commands composing the current dynamic scenario (HDMV mode) and methods composing the dynamic scenario (BD-J mode), one to be a processing target. First, when notified of a title number for execution by the module manager 34, the module converts the title number into mobj_id/bobj_id, and identifies the current dynamic scenario (Step S1). Then, the module sets the top command or method of the current dynamic scenario as Command/Method (Step S2), and executes a loop process of Steps S3 to S9. The loop process repeats a process of judging whether the Command/Method i is a PlayPL (Step S3), judging whether the Command/Method i is a Jump command (Step S4), then executing the Command/Method i (Step S5) and setting the next Command/Method i as the Command/Method i (Step S7), until the Command/Method i becomes the last Command/Method i of the current dynamic scenario i (Step S6).

If the Command/Method i is a PlayPL (Step S3: YES), PL playback is carried out (Step S8). If the Command/Method i is a Jump command, the module sets the title of the Jump destination as the current title and executes Step S1. If the processing target of the flowchart is the dynamic scenario of FIG. 13, a PlayPL in each of the IF-statement blocks 1 and 2 is executed in a mutually exclusive manner, which achieves playback of the PlayList in a mutually exclusive manner.

Since the present embodiment causes the playback device to select a PlayList for playback based on a magnitude relation between a constant and PSR(13) indicating an age, as described above, parental control can be achieved by a programmatic description. Because the parental control is realized by the programmatic description, various processes according to the age of the user can be attained by changing the constant and the specification of a playback path to be played. Thus, the present embodiment not only realizes parental control for setting the viewing control, but also can be developed to have various other controls. As a result, the present embodiment is capable of expanding the range of the playback control application, covering from viewing control over access to extreme video images to viewing control for learning materials.

Although a DVD-Video involves an immense amount of effort to define playback paths having multiple playback levels for each country, the present invention is able to omit the trouble of defining playback paths because it enables the definition of parental control for each country by executing selection procedures using a code of a country as a parameter.

Embodiment 2

Embodiment 1 discloses the internal structures for achieving parental control for a BD-ROM. Embodiment 2 is an embodiment realizing a hybrid playback device that implements parental control for both a BD-ROM and a DVD-Video.

The data configuration for realizing parental control for a DVD-Video is a publicly known art as shown in Patent Reference 1. The description here is a brief summary of the patent reference. Application data of a DVD-Video is composed of "VOBs" which correspond to AVClips of Embodiment 1 and "DVD scenarios" which correspond to dynamic and static scenarios. Among the DVD scenarios, the information components related to parental control are video manager general information (VMGI) and a PGC information table, which corresponds to PlayList information.

Figure 23:
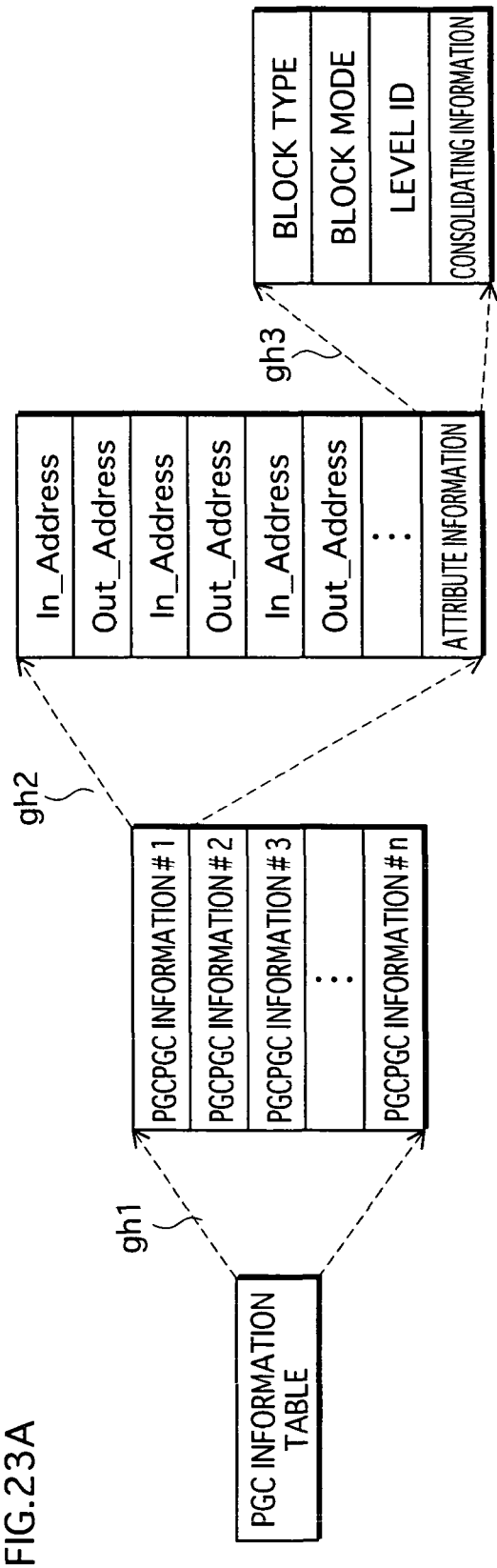
FIG. 23A shows an internal structure of a PGC information table.
FIG. 23B shows setting examples of block types, block modes, level IDs and consolidating information.

FIG. 23A shows the internal structure of the PGC information table. The PCG information table is composed of multiple PGC information pieces #1, #2, #3, . . . , and #n, as indicated by the lead line gh1 in the figure. The lead line gh2 in the figure shows the close detail of the internal structure of the PGC information piece. As indicated by the lead line, the PGC information piece defines a playback path by arranging multiple "In_Addresses", each corresponding to a start point of a playback section, and multiple "Out_Addresses", each corresponding to an end point of a playback section. The PGC information piece has a structure in which "attribute information" is added to the playback path. The arrow gh3 shows the close detail of the internal structure of the attribute information. The attribute information of the PGC information piece is, as shown in the figure, composed of "block type", "block mode", "level ID" and "consolidating information".

The "block type" is an attribute showing whether the PGC information piece itself forms a parental block. Blocks here means are groups of multiple playback paths for a single story, and each group has a different degree of extremeness of video images.

The "block mode" indicates that one playback path is located at the start, in the middle or at the end of the parental block. Thus, parental control for a DVD-Video is achieved by assigning such a playback level and a block mode to each playback path and causing the playback device to play playback paths according to the setting on the playback device.

The "Level IDs" show attributes of playback paths expressed in eight levels of the extremeness of video images.

The "consolidating information" shows which PGC information piece is played after the playback of the PGC information piece itself is finished.

For structuring parental blocks similar to ones shown in FIGS. 13 and 14 by using PGC information pieces, their block types, block modes, level IDs and consolidating information have to be set as shown in FIG. 23B.

Figure 24:
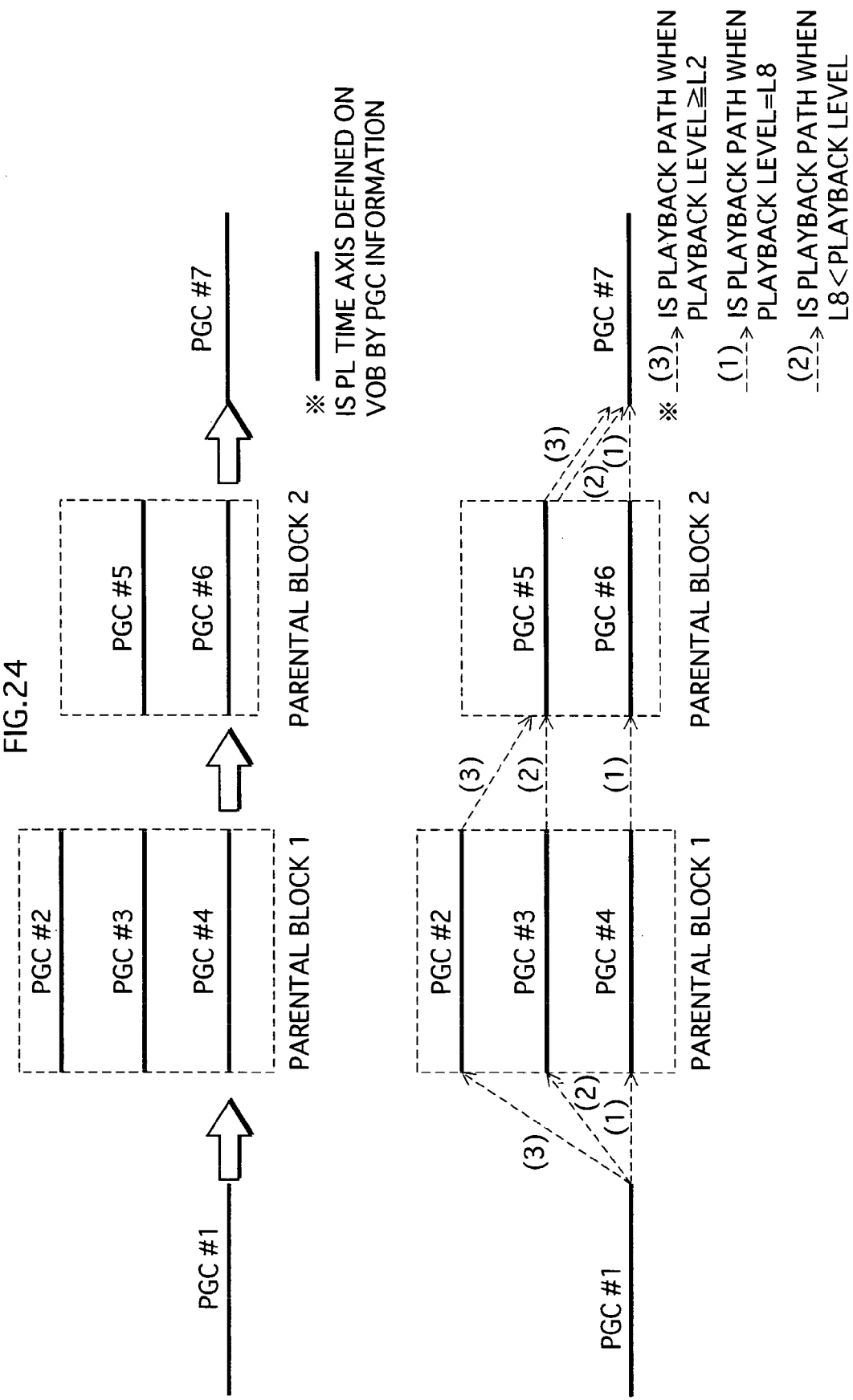
FIG. 24 shows playback paths defined by multiple PGCs.

Assume that, in FIG. 23B, PGC information pieces #1 to #7 correspond to PlayLists #1 to #7, respectively. PlayLists #2 to #4 in FIG. 13 are played in a mutually exclusive manner according to a magnitude relation with the value of PSR(13), and also PlayLists #5 and #6 are played in a mutually exclusive manner according to a magnitude relation with the value of PSR(13). In FIG. 23B, the block modes and block types are described so that PGC information pieces #2 to #4 to be played in a mutually exclusive manner are located at the start, in the middle and at the end of the parental blocks, respectively. The level ID of L2 is added to the PGC information piece #2 located at the start, similarly the level ID of L5 is added to the PGC information piece #3 located in the middle, and the level ID of L8 is added to the PGC information piece #4 located at the end. Since such attributes are set in the PGCs, multiple PGCs can be played in a similar manner to the case of FIG. 14. FIG. 24 shows playback paths defined by multiple PGCs. Here, since PGC#2 to PGC#4 constitute Block 1 and PGC#5 and PGC#6 constitute Block 2, the PGCs are played in the order of: PGC#1→Parental Block 1 (PGC#2, PGC#3 or PGC#4)→Parental Block 2 (PGC#5 or PGC#6)→PGC#7. At the playback of Block 1, among PGC#2, PFC#3 and PGC#4 included in Block 1, one that corresponds to the playback level set on the playback device is played. At the playback of Block 2, between PGC#4 and PGC#5 included in Block 2, a PGC corresponding to the playback level set on the playback device is played. Thus concludes the description of the PGC information pieces. Next is described VMGI.

Figure 25:
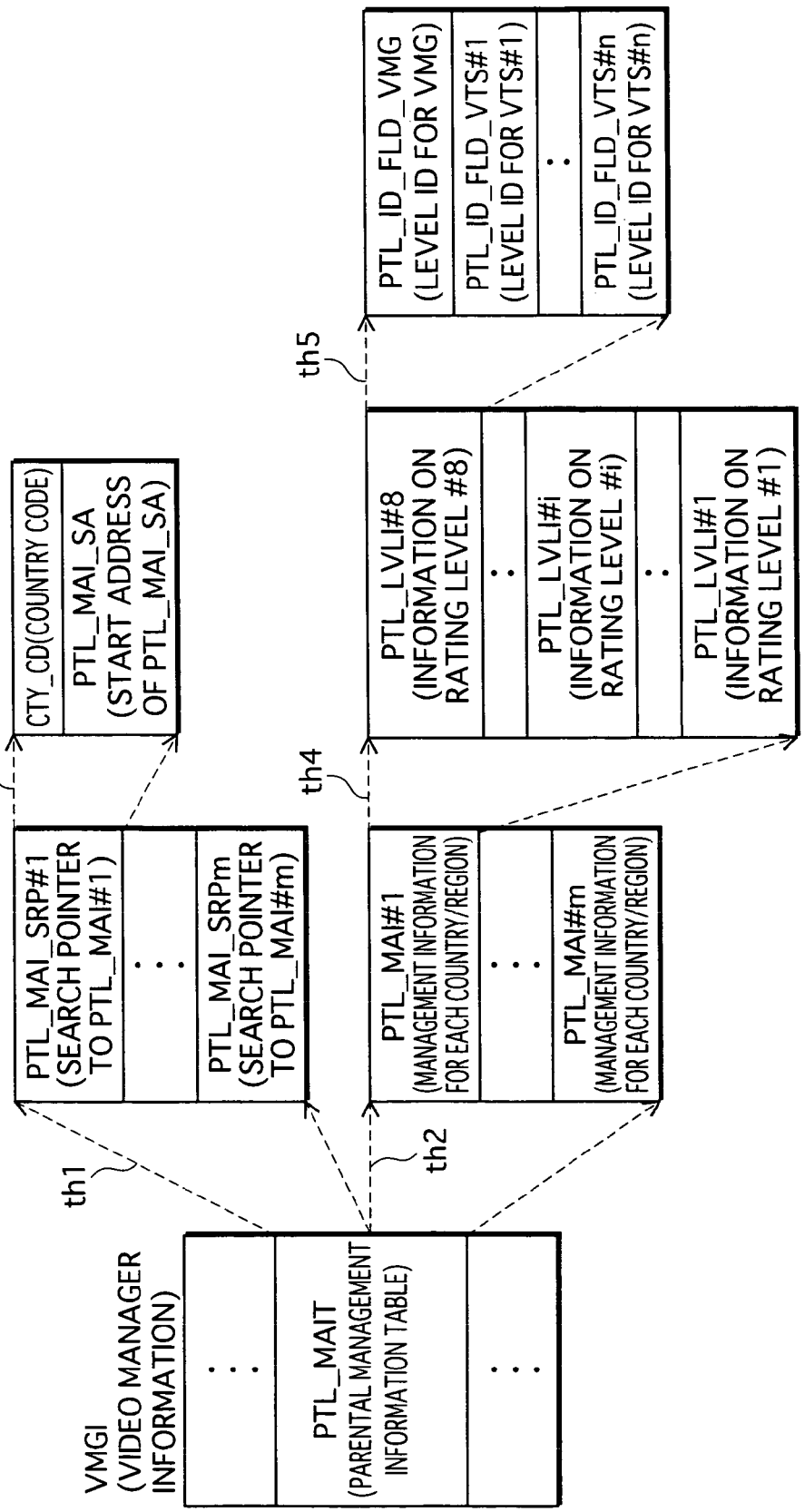
FIG. 25 shows an internal structure of VMGI (Video ManaGer Information)

FIG. 25 shows the internal structure of VMGI (Video ManaGer Information). The VMGI is shown on the left side of FIG. 25. As shown in the figure, the VMGI includes "PTL_MAIT(ParenTaL_MAnagement Information Table)". The lead line of the figure shows the close detail of the structure of PTL_MAIT. As indicated by the lead lines th1 and th2, PTL_MAIT includes "PTL_MAI_SRPs#1-#m" and "PTL_MAIs#1-#m". PTL_MAIs#1-#m are management information pieces for individual countries, and each of them is assigned, for example, to Japan, the United States, Britain and France. "PTL_MAI_SRPs#1-#m" are search pointers for the respective country-specific PTL_MAIs, and each of them includes "CTY_CD" representing a country code and "PTL_MAI_SA" indicating a writing destination address of PTL_MAI corresponding to the country code, as shown by the dotted arrow th3.

The lead line th4 in the figure shows the close detail of the internal structure of a given PTL_MAI selected out of m pieces of PTL_MAIs. As indicated by the lead line, PTL_MAI is composed of up to eight PTL_LVLIs#8-#1. PTL_LVLI is information defining a rating level of a country. For a country like Japan, which has three rating levels of Adults, R rating and General, PTL_LVLIs#8-#6 become effective. For a country like the United States, which has six rating levels of G, PG, PG-13, R, NC-17 and X, PTL_LVLIs#8-#3 become effective. The lead line th5 shows the close detail of the structure of PTL_LVLI. PTL_LVLI is information for mapping a playback level corresponding to the rating level with respect to each DVD content. The DVD contents include multiple contents: a video manager structuring the root menu and multiple video title sets. PTL_LVLI includes information for assigning a level ID to each of the multiple contents (PTL_ID_FLD_VMG, PTL_ID_FLD_VTSs#1-#n). PTL_ID_FLD_VMG in the figure indicates a level ID assigned to the video manager, and PTL_ID_FLD_VTS#1 indicates a level ID assigned to the video title set #1. PTL_ID_FLD_VTS#n is a level ID assigned to the video title set #n.

Figure 26:
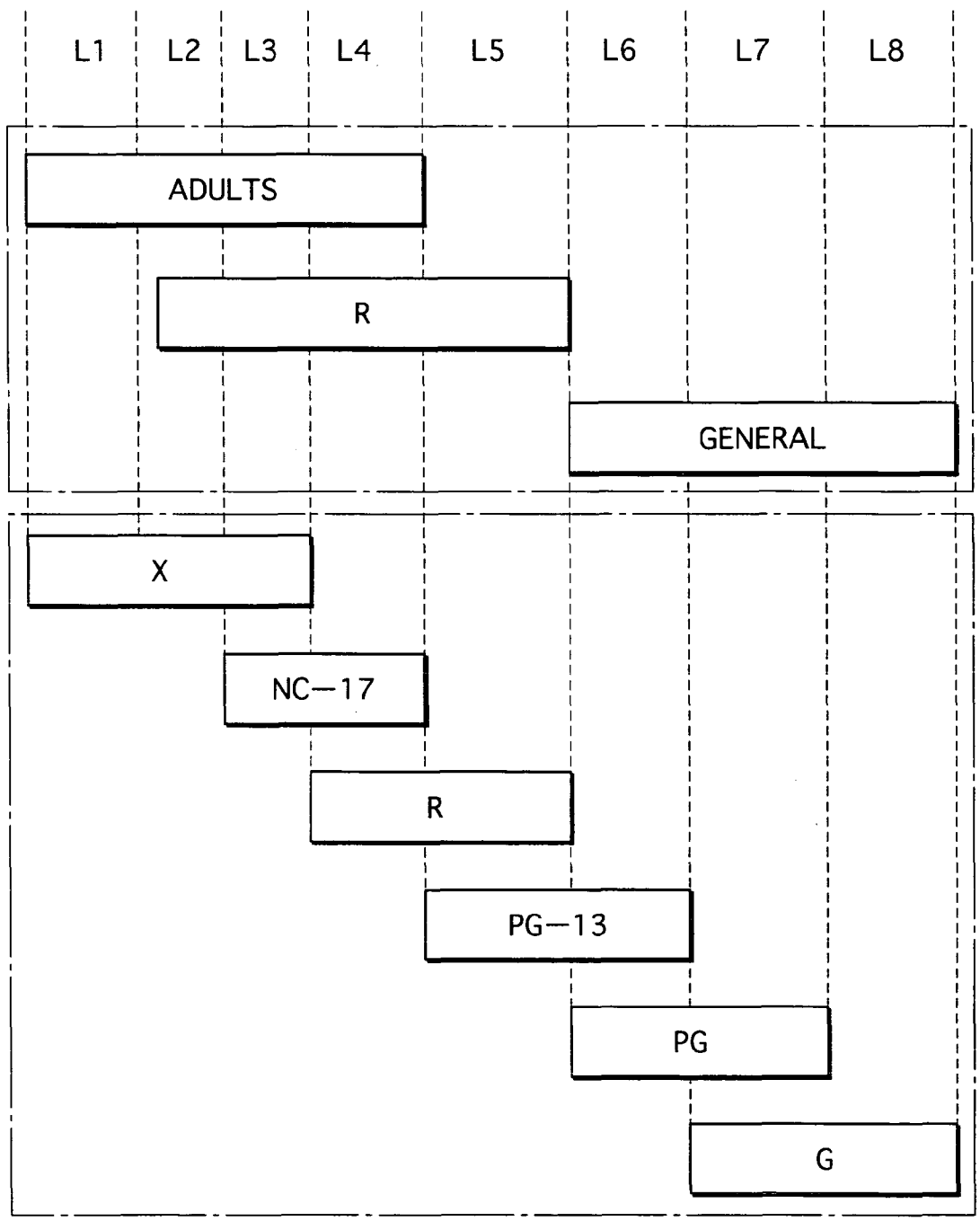
FIG. 26 is a simplified drawing showing PTL_LVLIs assignment.

FIG. 26 is a simplified drawing showing assignment by PTL_LVLIs. The horizontal axis of the figure represents eight playback levels of L1 to L8, while the vertical axis represents three rating levels for a region such as Japan and six rating levels for another region such as the United States. As to PTL_MAI in FIG. 26, three rating levels of General, R rating and Adults in the Japanese rating system can be assigned to PTL_LVLIs#8-66. Then, by stating the level IDs of L1 to L8 in PTL_ID_FLD_VMG and PTL_ID_FLD_VTSs#1-#n of PTL-LVLIs#8-#6, L1-L4 can be assigned to "Adults" of the Japanese rating system, L2-L5 to "R rating", and L6-L8 to "General" as shown in FIG. 26. On the other hand, L1-L3 can be assigned to "x" of the rating system of the United States, L3-L4 to "NC-017", and L4-L5 to "R". According to such assignment for PTL_MAI, it is possible to achieve a rating system for each country.

Thus concludes the description of DVD scenarios. Next is described the internal structure of a playback device according to Embodiment 2.

Figure 27:
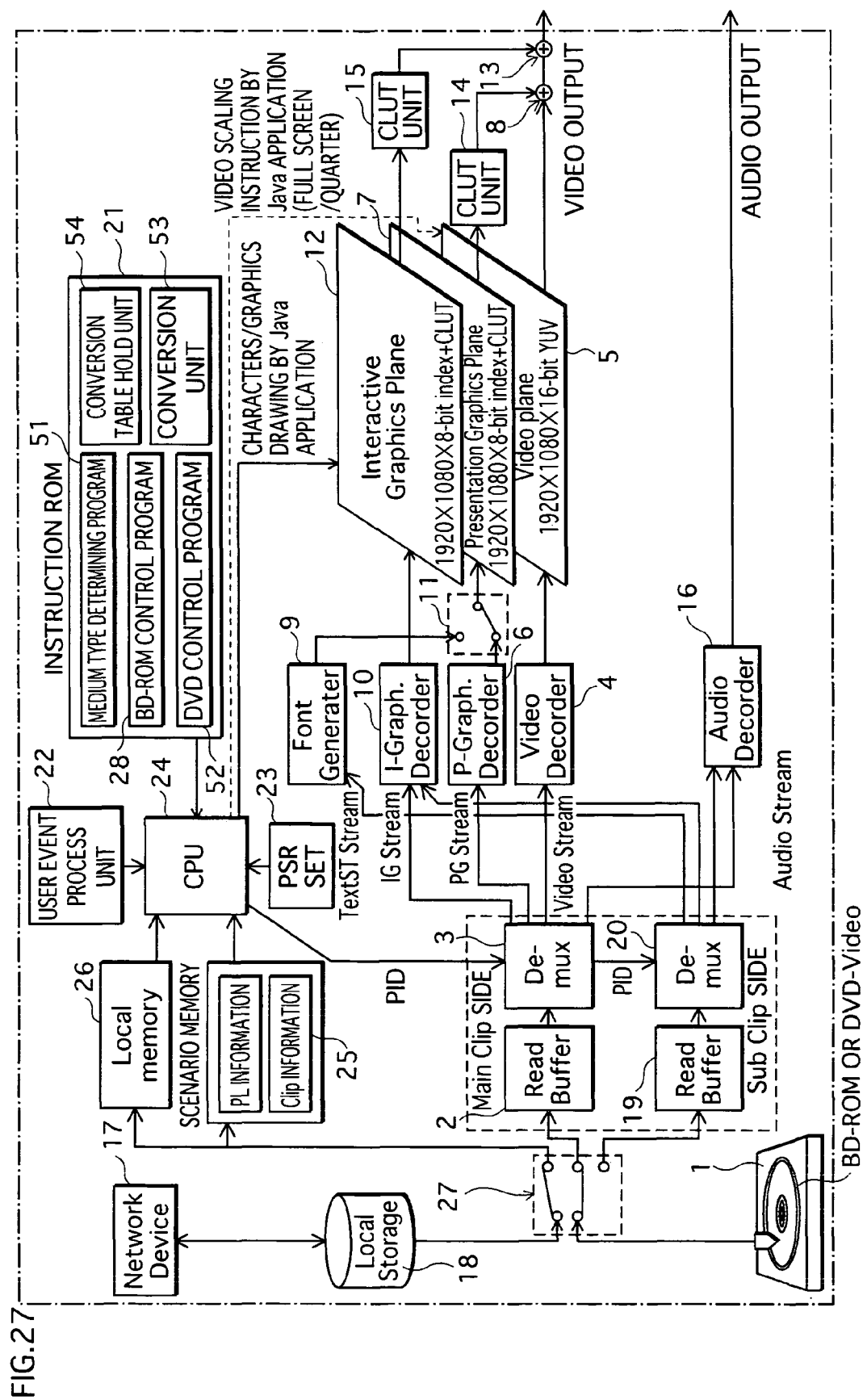
FIG. 27 shows an internal structure of a playback device of Embodiment 2.
Figure 28:
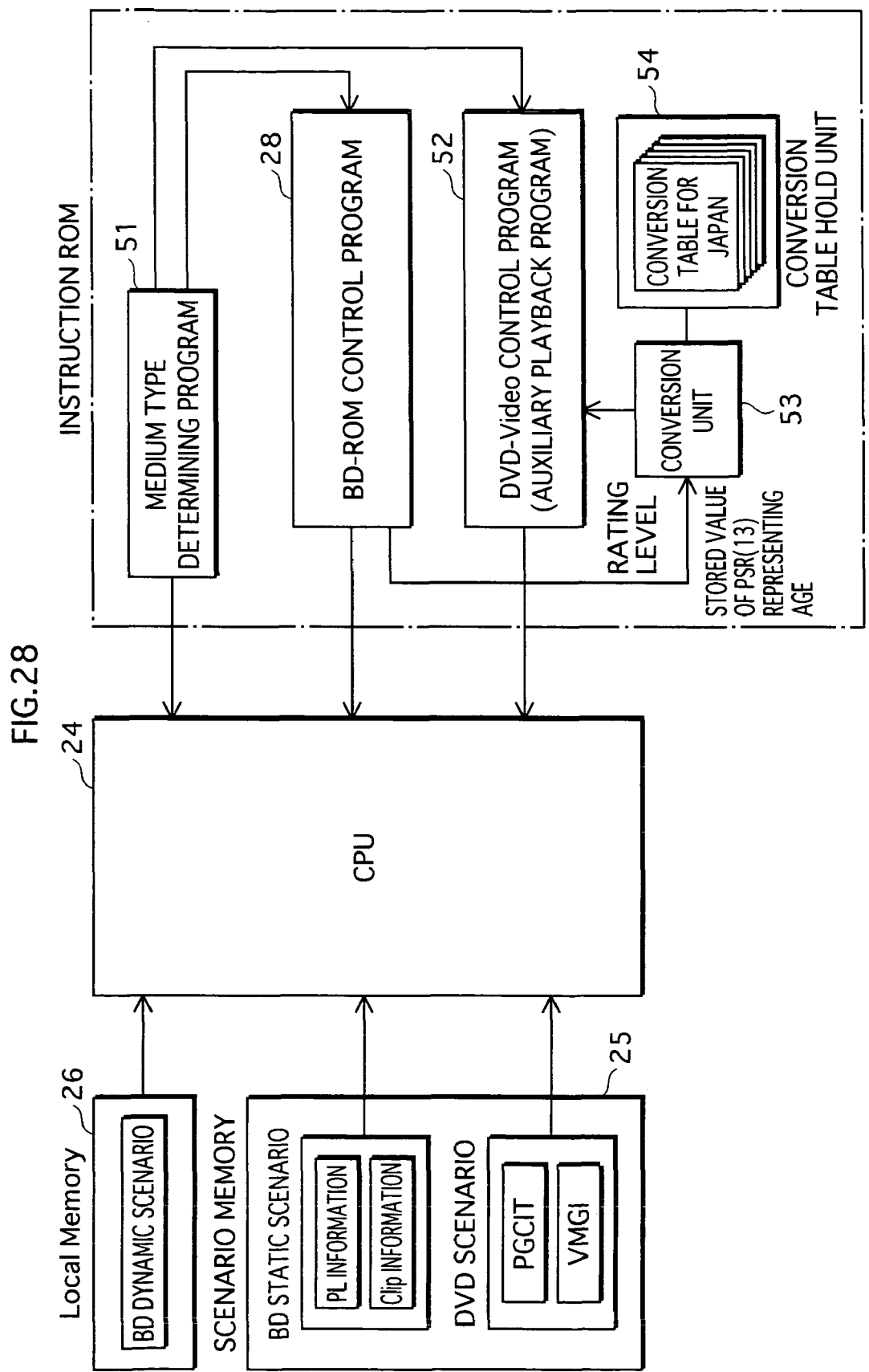
FIG. 28 shows a medium type determining program 51, a DVD-Video control program 52, a conversion unit 53, and a conversion table hold unit 54 stored in an instruction ROM 21.

FIG. 27 shows the internal structure of the playback device of Embodiment 2. Although the playback device is capable of performing DVD-Video playback, the playback device has substantially the same internal structure as that of Embodiment 1, and is composed of the BD drive 1 to the BD-ROM control program 28. This is because the BD-ROM player model is originally developed with the view to upper compatibility of the DVD-Video player model. The difference from FIG. 20 is that a medium type determining program 51 to a conversion table hold unit 54 are contained in the instruction ROM 21, in addition to the BD-ROM control program 28. These are components having software characteristics and shown in FIG. 28. Because the medium type determining program 51, DVD-Video control program 52, conversion unit 53 and conversion table hold unit 54 in FIG. 28 are stored in the instruction ROM 21, the playback device is able to play not only BD-ROMs but also DVD-Videos. These components having software characteristics are described below.

The medium type determining program 51 determines whether an optical disk loaded on the BD drive 1 is a BD-ROM or a DVD-Video by referring to medium type information recorded in the lead-in area of the loaded optical disk.

Figure 29:
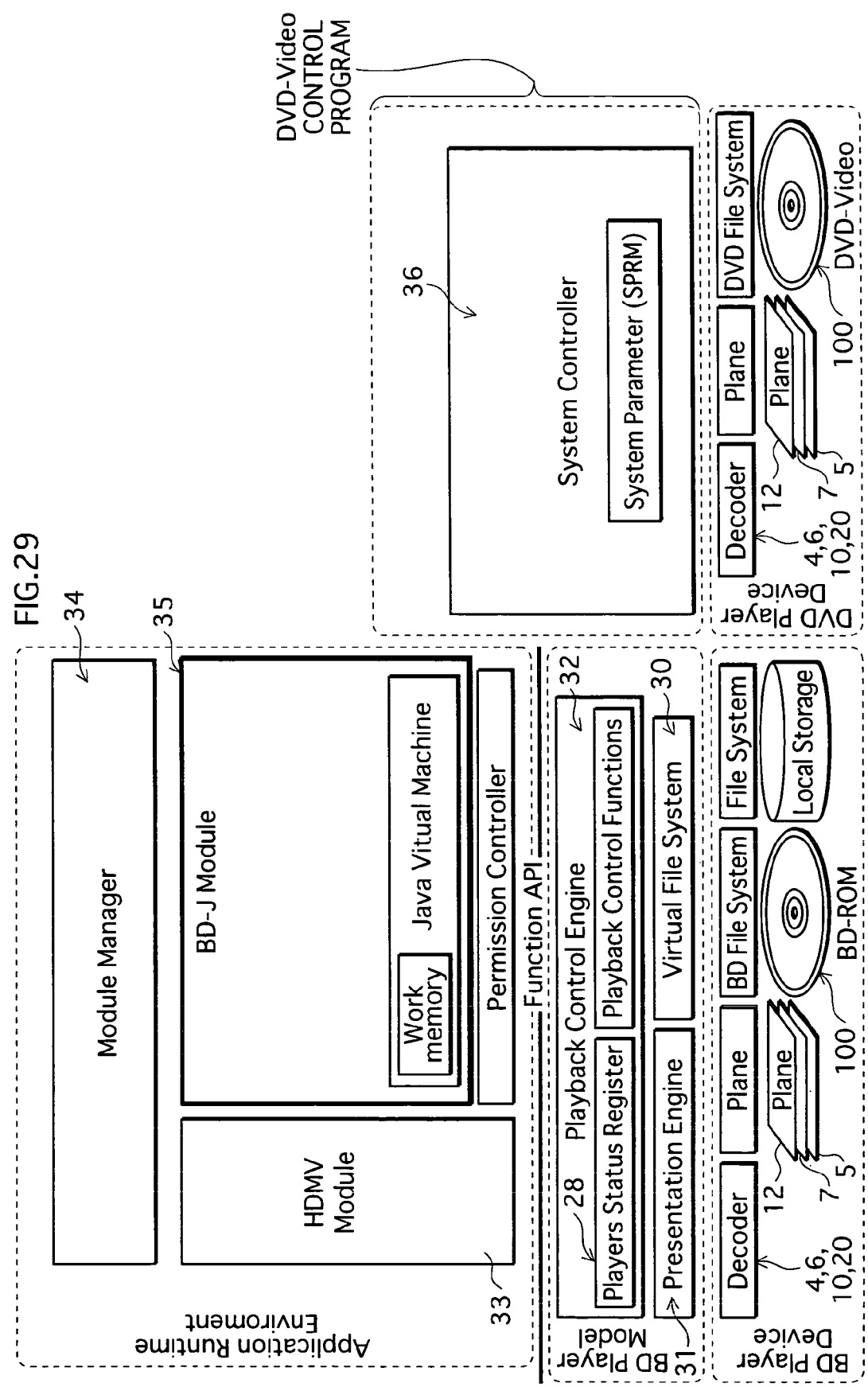
FIG. 29 shows the positioning of the DVD-Video control program 52 in the layer model of software, being depicted in a similar manner to FIG. 21.

The DVD-Video control program 52 is an auxiliary playback control program used for performing playback when a DVD-Video is loaded, and plays VOBs recorded on the DVD-Video based on DVD-Video scenarios such as PGCIT and VMGI. FIG. 29 is depicted in a similar manner to FIG. 21, and shows the positioning of the DVD-Video control program 52 in the layer model of software. In FIG. 29, the layer model of a BD-ROM is composed of three levels of "BDPlayer Device", "BD player Model" and "Application Runtime Environment". On the other hand, the layer model of a DVD-Video is composed of a "DVD Player Device" layer, which corresponds to hardware of a DVD-Video playback device, and a system controller layer. This is because, in a DVD-video, playback paths corresponding to PLs and navigation commands corresponding to dynamic scenarios are integrally structured, and therefore a DVD-Video does not require to make differentiation such as "BD player Model" and "Application Runtime Environment".

The system controller 36 is a control program for controlling the entire system of the playback device when a DVD is loaded. As the Playback Control Engine 28 includes a PSR set, the system controller 36 also holds a register group for state settings of the playback device. The register group is called SPRM, and realized by a nonvolatile memory similarly to the BD-ROM control program 28. Thus concludes the description of FIG. 29. The components shown in FIG. 28 are explained next.

When the user inputs either a rating level or an age on the setup menu, the conversion unit 53 performs conversion from the rating level to an age, or from the age to a rating level. When an age is obtained by the conversion, the BD-ROM control program 28 writes the given age in PSR(13). When PSR(13) is filled in this way, the BD-ROM control program 28 plays a movie work by implementing parental control based on the age.

When a rating level is obtained by the conversion, the conversion unit 53 writes the given rating level in SPRM. When SPRM is filled in this way, the DVD-Video control program 52 plays a movie work by implementing PGC playback based on the rating level.

The conversion table hold unit 54 has multiple conversion tables. The conversion tables are tables in which each of multiple ages is associated with a rating level. The conversion table hold unit 54 has such a conversion table for each country having rating levels.

FIG. 30A is one example of a conversion table for Japan. Here, since Adults means audience under the age of 18 and R means high school students or younger in the rating system of a Java program, the rating levels of "Adults" and "R" are associated with the ages marking the borders—for example, 18 years old for Adults and 16 years old for R.

FIG. 30B is one example of a conversion table for the United States. Since the rating level "X" means adults or older, NC-17 and R mean audience under the age of 17, and PG-13 means 14 years old or younger, the conversion table associates the ages marking the borders between the rating levels with the rating levels.

Since NC-17 and R are associated with 17 years old, if either one of NC-17 and R is set on the playback device, a value of "17" is stored in PSR(13).

Because such a conversion table is provided for each rating system, it is possible to convert rating levels of various countries into ages, and also possible to convert ages into various country-specific rating levels. PTL_LVLI associates a rating level with a playback level, and the conversion table associates the playback level with an age. Thus, an age can be derived from a rating level via PTL_LVLI and the conversion table, and a rating level can be derived from an age.

Figure 31:
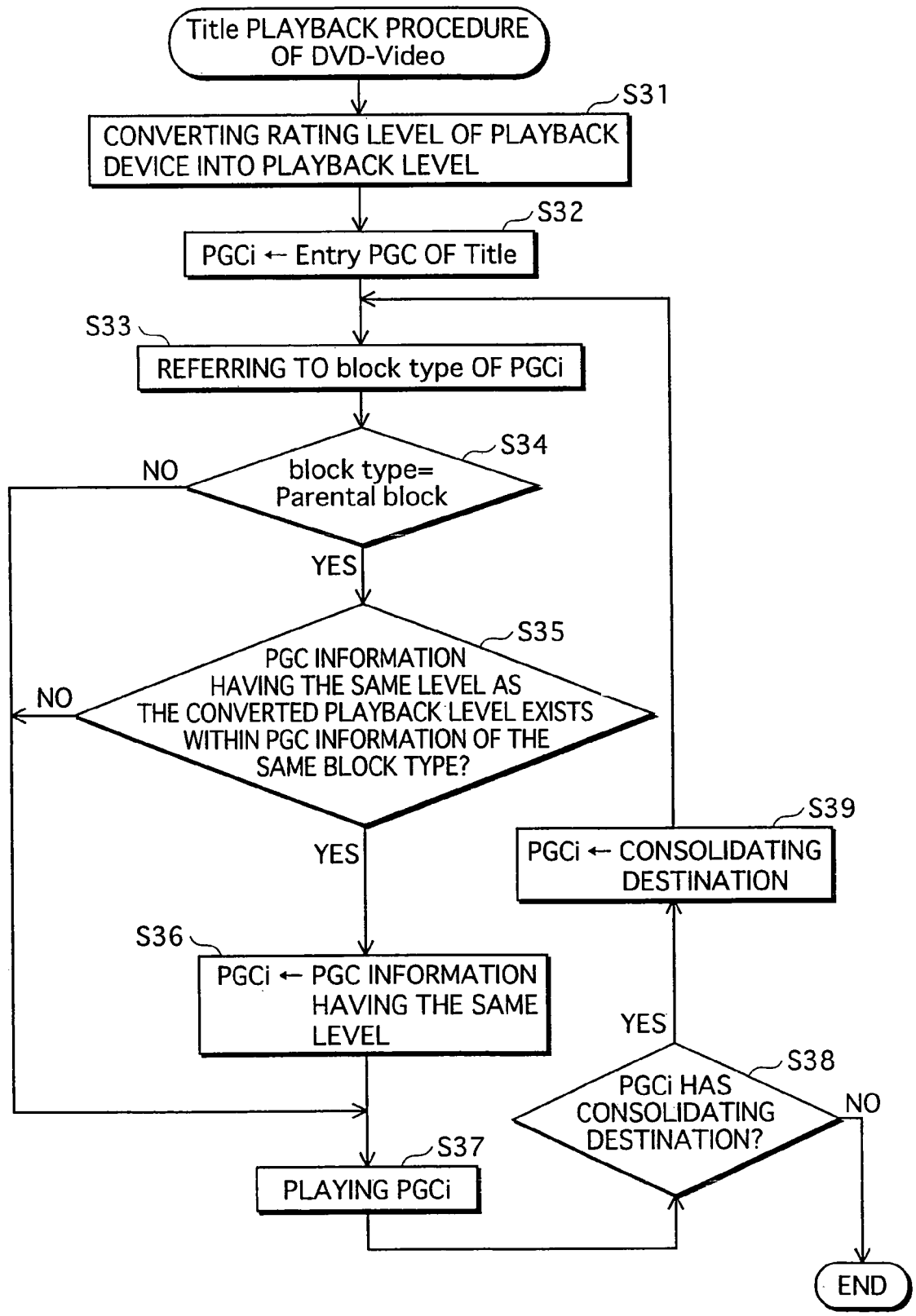
FIG. 31 is a flowchart showing a title playback procedure of a DVD-Video.

Thus concludes the description of various programs stored in the instruction ROM 21. Next is described the control procedure of the DVD-Video control program 52 with reference to FIG. 31. FIG. 31 is a flowchart showing a title playback procedure of a DVD-Video. The playback procedure of the flowchart is as follows: converting an age stored in PSR (13) into a rating level, and converting the rating level into a playback level (Step S31); and executing Step S32 to Step S39 to play a title of a DVD-Video. Steps S32 to S39 form a loop process of setting EntryPGC of the title in PGCi (Step S32), undergoing Steps S33 to S36 to play the PGCi (Step S37); performing a judgment at Step S38; and setting the consolidating destination of the PGC information piece in the PGC information i (Step S39).

Steps S33 to S36 are composed of: referring to a block type of the PGC information i (Step S33); judging whether the block type of the PGC information i is a parental block (Step S34); and skipping Steps S35 and S36 when the block type is not a parental block, and judging, when the block type is a parental block, whether a PGC information piece having the same level as the converted playback level exists within PGC information pieces of the same block type (Step S35). If such a PGC information piece is present, the PGC information piece having the same level is set as the PGC information i (Step S36), and the PGC information i is played.

The present embodiment above is able to readily achieve a hybrid system capable of implementing parental control on both DVD-Video playback and BD-ROM playback, and whereby is able to contribute to the dissemination of BD-ROM playback devices.

Embodiment 3

Embodiment 3 is an embodiment relating to inputs of an age and a rating level on the setup menu. FIG. 32 shows contents stored in the instruction ROM 21, which is depicted in a similar manner to FIG. 28. The instruction ROM 21 in the figure is different from one shown in FIG. 28 in a setup program 55 being added besides the medium type determining program 51 to the conversion table hold unit 54.

Figure 33:
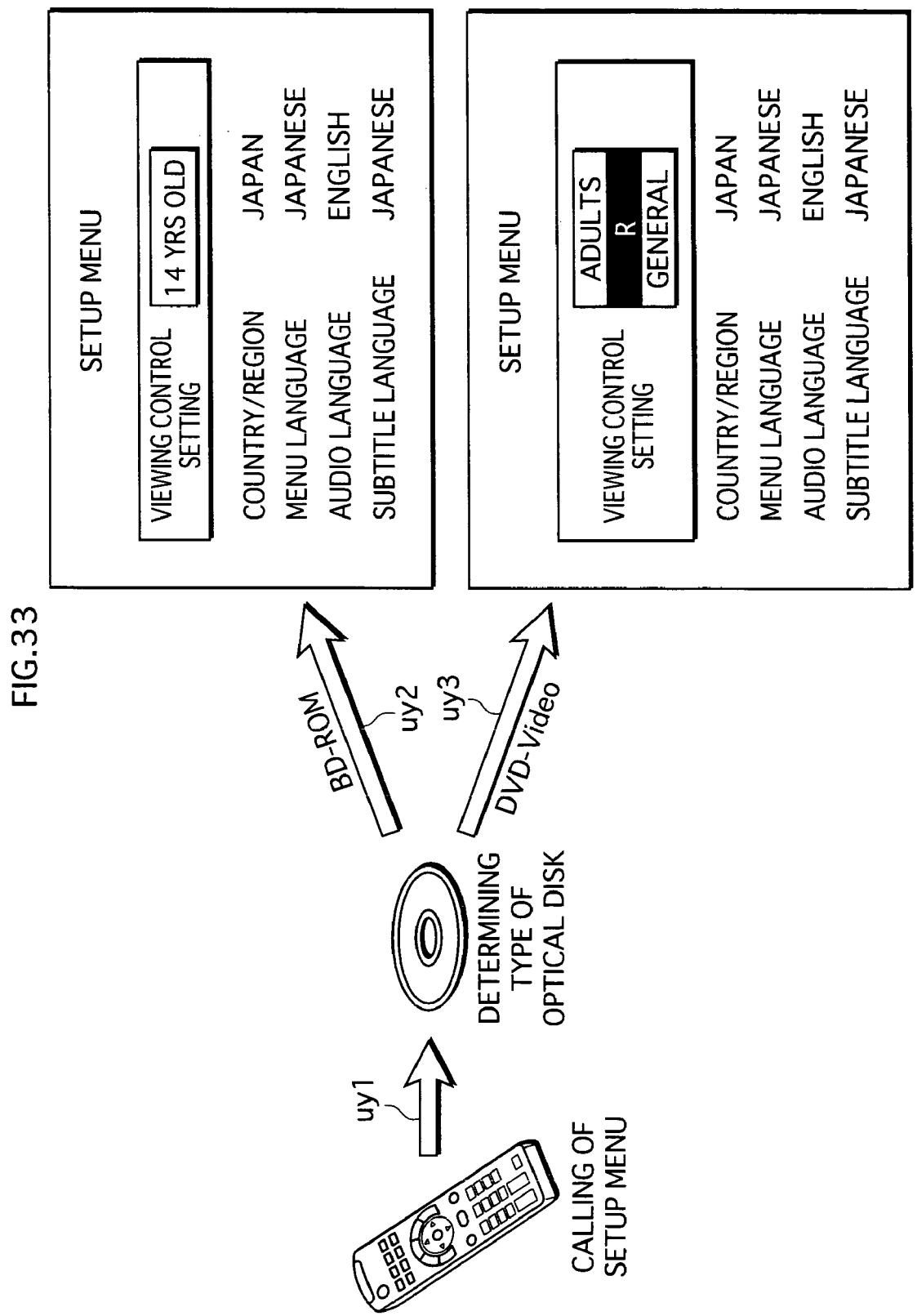
FIG. 33 shows change in the setting method of the viewing control setting performed by a setup process unit 55.

The setup program 55 displays the setup menu in response to a user operation on the remote controller 300, receives various settings from the user, and writes the settings to PSR(13) of the BD-ROM process unit 53 or SPRM of the DVD-Video control program 53. The setting items received on the setup menu are composed of five items of viewing control setting, country, menu language, audio language and subtitle language. The setup program 56 has two characteristics. The first characteristic is switching the setting method of the viewing control setting according to the type of the recording medium loaded on the drive device 1. FIG. 33 shows change of the setting method of the viewing control setting performed by the setup process unit 55. When the setup program 56 is initiated by an instruction of the setup-menu readout made on the remote controller 300, the type of the recording medium is determined as shown by the arrow uy1. If the type of the recording medium is a BD-ROM, an input of a value indicating an age is received for the viewing control setting, as shown by the arrow uy2. When the type of the recording medium is a DVD-Video, a rating level (the figure shows Japanese rating levels) is received for the viewing control setting, as shown by the arrow uy3. Thus, the setup program 56 switches the setting method according to the type of the loaded recording medium, and whereby allows for an input for the setting method either specific to a DVD-Video or BD-ROM.

The second characteristic is that, when the viewing control setting is made by either a BD-ROM or a DVD-Video input method, the setup program 56 causes the conversion unit 53 to convert the setting value into one in a different format and sets the converted value to PSR/SPRM. Such an automatic setup significantly saves the trouble of the viewing control setting performed by the user.

Figure 34:
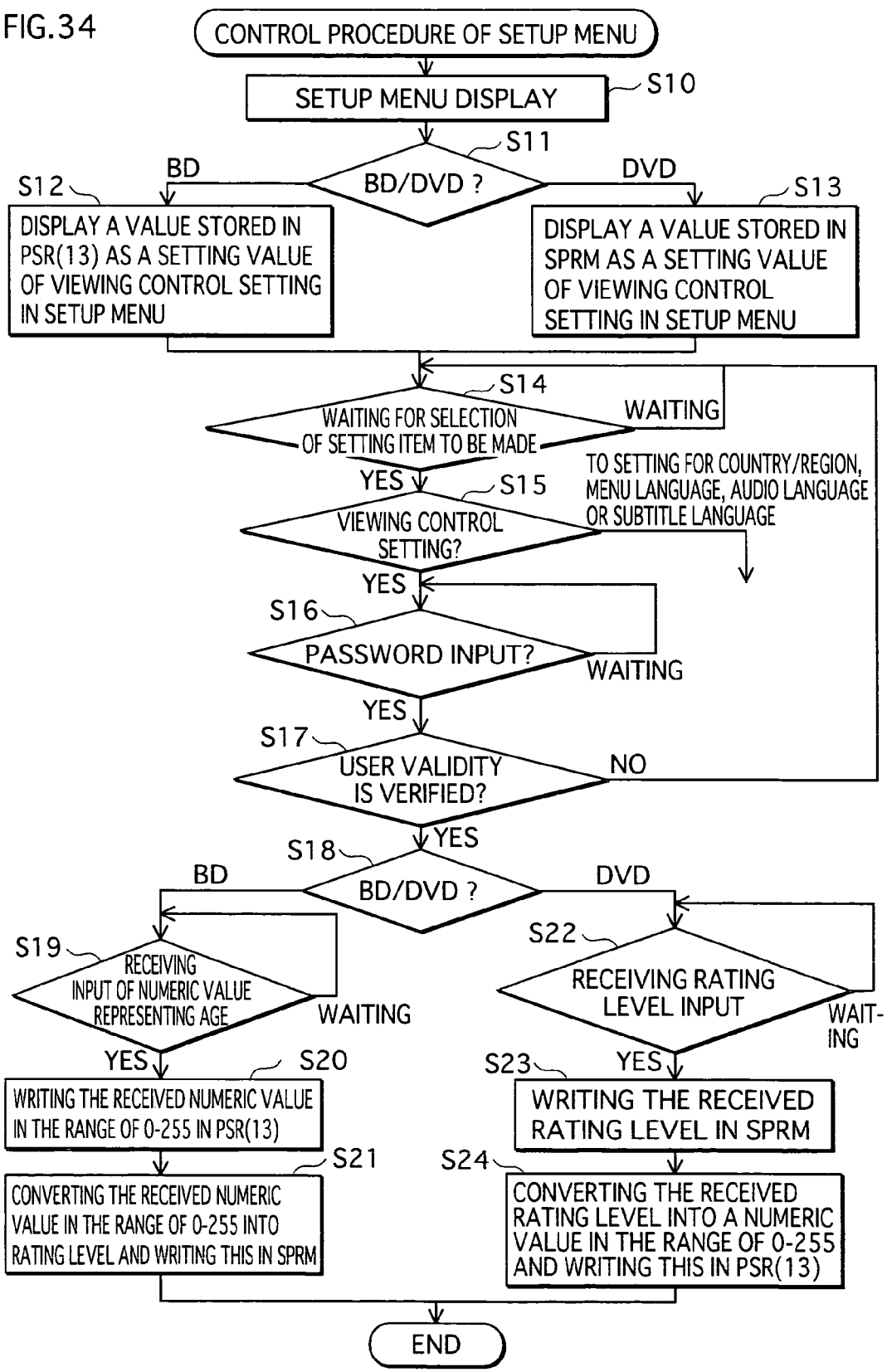
FIG. 34 is a flowchart showing a process-procedure of the setup process unit 55.

The process procedure of the setup process unit 55 is described with reference to the flowchart of FIG. 34. After displaying the setup menu (Step S10), the setup process unit 55 judges whether the recording medium loaded on the playback device is a BD-ROM or DVD-Video (Step S11). When it is a BD-ROM, the setup process unit 55 displays the value stored in PSR(13) as the viewing control setting on the setup menu (Step S12). On the other hand, when it is a DVD-Video, the setup process unit 55 displays the value stored in SRPM as the setting value of the viewing control setting on the setup menu (Step S13). Subsequently, the setup process unit 55 waits for selection of a setting item to be made on the setup menu (Step S14). When a setting item is selected, the setup process unit 55 determines whether the selected item is the viewing control setting (Step S15). If not, the setup process unit 55 carries out a corresponding process procedure for setting the country, menu language, audio language or subtitle setting (the process procedures for these items are not the focus of the present invention, and therefore the descriptions are omitted here).

If the selected item is the viewing control setting, the setup process unit 55 waits for a password input by the user (Step S16). After a password is input, the user validity is verified (Step S17). If the validity is not determined, the setup process unit 55 returns to the selection wait state of Step S14. If the validity is determined, the setup process unit 55 then determines whether the recording medium loaded on the playback device is a BD-ROM or a DVD-Video (Step S18). If the loaded medium is a BD-ROM, the setup process unit 55 waits for a value of an age to be input (Step S19). When an input is made, the entered value in the range of 0 to 255 is written to PSR(13) (Step S20). On the other hand, the setup process unit 55 causes the conversion unit 53 to convert the entered value into a rating level and write this to SPRM (Step S21).

The viewing control setting on the setup menu is made by inputting a numeric value of the age of the user. In the case where one playback device is shared by a family and more than one person can be the user of the playback device, the age of the youngest user has to be input in the viewing control setting. This is because otherwise the effectiveness of the parental control for not showing extreme videos to youngster and children cannot be maintained.

When the loaded medium is a DVD-Video, the setup process unit 55 remains in a wait state for a rating level input (Step S22). After a rating level is input, the setup process unit 55 writes the entered rating level in SPRM (Step S23). On the other hand, the setup process unit 55 causes the conversion unit 53 to convert the entered rating level into a value in the range of 0 to 255 and write this to PSR(13) (Step S24).

Embodiment 4

Figure 35:
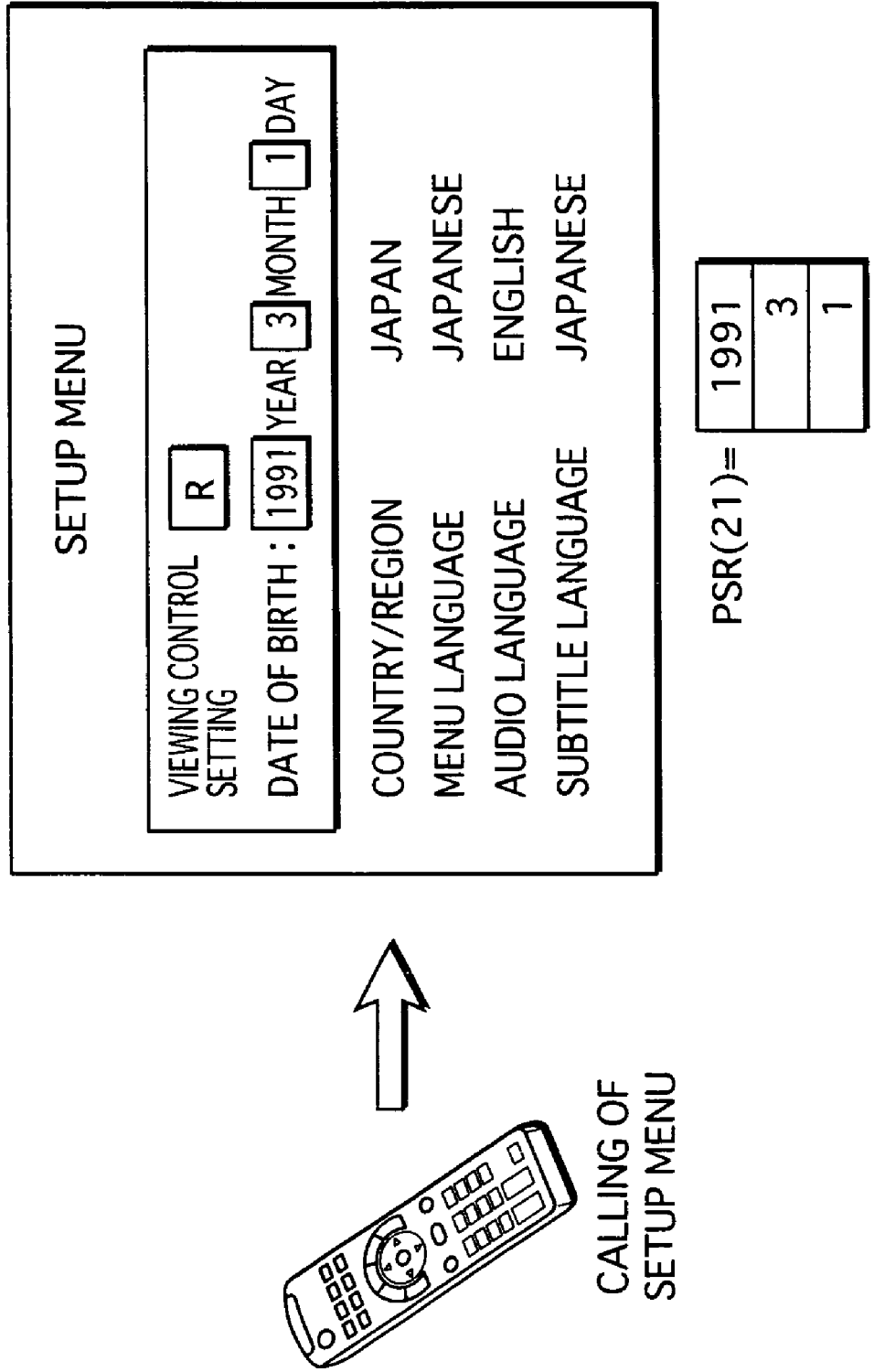
FIG. 35 shows an example of a setup menu of Embodiment 4.

The setup menus of Embodiments 1 and 2 receive an input of a value indicating the age from the user when a BD-ROM is loaded, whereas the setup menu of Embodiment 4 receives the date of birth from the user. FIG. 35 shows an example of the setup menu according to Embodiment 4. The setup menu of the present embodiment receives inputs of the "year", the "month" and the "day". In response to these inputs, the setup process unit 55 sets these to auxiliary PSR.

The setup process unit 55 also calculates the age base on the current date and the input date, and writes the calculated age to PSR(13). Since the rating level can be calculated once the age has been calculated, the rating level is also written to SPRM.

Thus, if the date of birth is stored besides the age, the age stored in PSR(13) can be increased every year when the birthday comes around.

Figure 36:
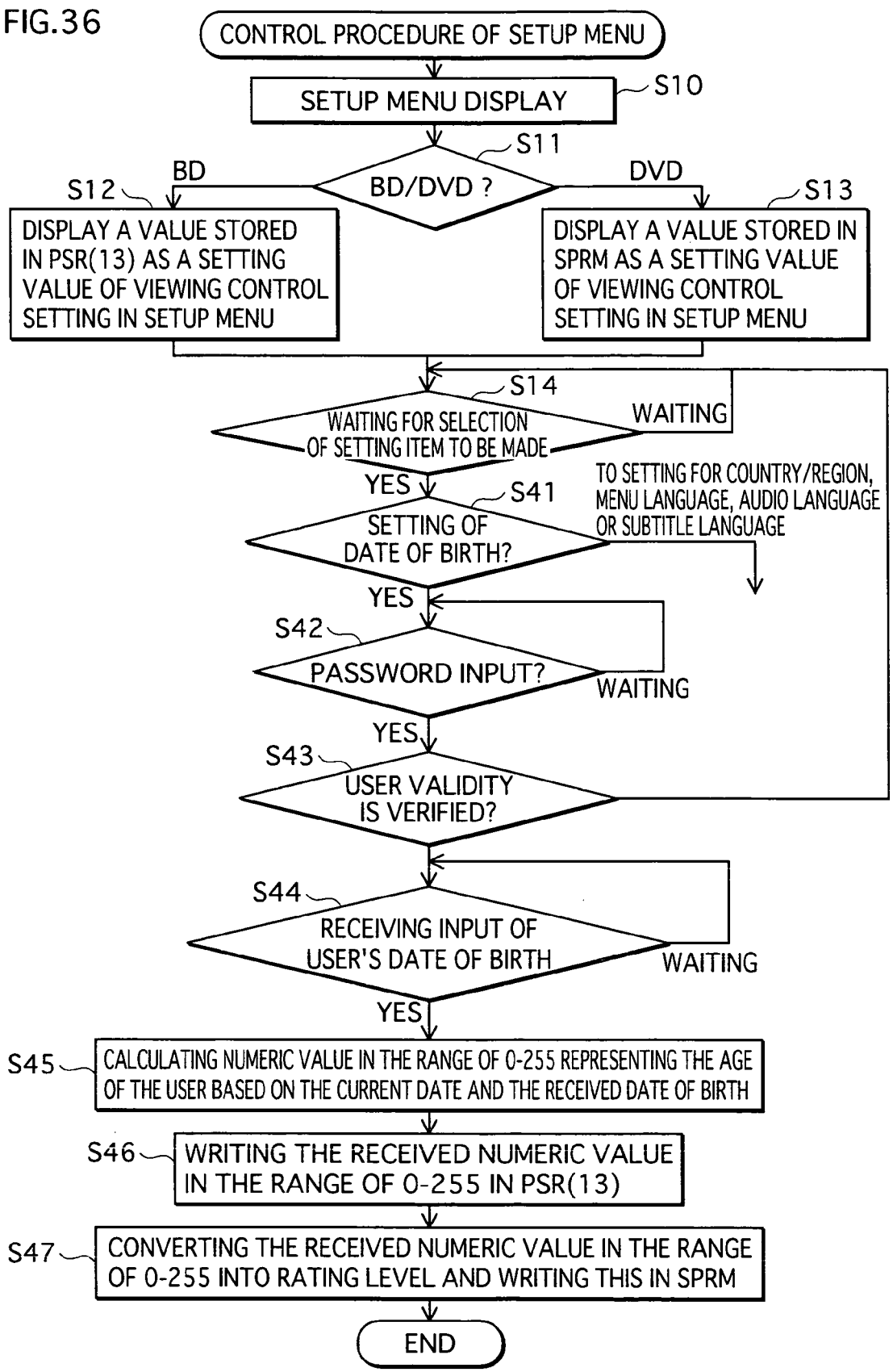
FIG. 36 is a flowchart showing a process procedure of the setup process unit 55 of Embodiment 4.

FIG. 36 is a flowchart showing a process procedure of the setup process unit 55 according to Embodiment 4.

The flowchart of FIG. 36 is based on the flowchart of FIG. 33. In FIG. 36, Steps S15 to S24 of FIG. 34 are replaced with Steps S41 to S47. Step S41 is a step to be executed when the viewing control setting is selected at Step S14 of waiting for a selection to be made, and a judgment is made for whether setting of the date of birth is selected. If setting for the date of birth is selected, the setup process unit 55 waits for a password input (Step S42). If the user validity is verified by the input of the password (Step S43), the setup process unit 55 receives an input of the date of birth (Step S44).

Thus, after the date of birth is input, a value in the range of 0-255 representing the age of the user is calculated based on the current date and the received date of birth (Step S45). Subsequently, the setup process unit 55 writes the calculated value in the range of 0-255 in PSR(13) (Step S46), and also converts the received value in the range of 0-255 into a rating level and writes the rating level to SPRM (Step S47).

The present embodiment is, as described above, able to obtain a specific starting date of the age computation since the date of birth is stored besides the age and an age calculated based on the date of birth is written to PSR(13). Herewith, the relaxation of the parental control with the course of time can be precisely carried out.

Embodiment 5

The setup menu of Embodiment 1 receives a rating level input for a DVD-Video while receiving an age input when a BD-ROM is loaded. On the other hand, Embodiment 3 relates to an improvement in interlocking the inputs of the age and the rating level. FIG. 37 shows a setup menu of Embodiment 5. The setup menu in the figure is different from that in FIG. 33 in that the rating level and the age are displayed in association with each other in the viewing control setting items. The input of either the age or the rating level is interlocked with the input of the other. When the user operates the up/down button to decrease the displayed age, the rating level is also set lower in conjunction therewith. On the other hand, when the user operates the up/down button to decrease the rating level, an age decreased in conjunction with a decrease in the rating level is displayed. Such interlocking facilitates understanding the association between the rating level and the age.

Remarks

The above description by no means shows the implementation of all configurations of the present invention. Implementation of the present invention is still possible according to implementation of configurations that carry out the following-modifications (A), (B), (C), (D), . . . . The inventions pertaining to the claims of the present application range from expanded disclosure to generalized disclosure of the plurality of embodiments disclosed above and the modified configurations thereof. The degree of expansion or generalization is based on the particular characteristics of technical standards in the technical field of the present invention at the time of application.

(A) In all of the embodiments, an optical disk pertaining to the present invention is implemented as a BD-ROM. However, the recording medium of the present invention is characterized by the recorded graphics streams and the characteristic is not dependent on the physical properties of a BD-ROM. Any form of recording media is applicable as long as there exists the capacity to record graphics streams. For example, optical disks such as DVD-ROM, DVD-RAM, DVD-RW, DVD-R, DVD+RW, DVD+R, CD-R, CD-RW, and the like, and optical-magnetic disks such as PD, MO and the like are applicable. Semiconductor cards such Compact Flash Cards, Smart Media Cards, Memory Sticks, MultiMedia Cards, PCM-CIA cards and the like are also applicable, as are (i) magnetic recording disks such as flexible disks, SuperDisk, Zip, Clik! and the like, and (ii) removable hard disk drives such as ORB, Jaz, SparQ, SyJet, EZFley, microdrive and the like. Furthermore, the recording medium may also be a built-in hard disk.

(B) Although the playback devices in all of the embodiments output AVClips recorded on a BD-ROM to a TV after decoding, the playback device may be structured from only a BD-ROM drive, and the TV may be equipped with all of the other elements. In this case, the playback device and the TV can be incorporated into a home network connected using IEEE1394. Also, although the playback devices in the embodiments are of a type used after connecting to a television, integral display-playback devices are also applicable. Furthermore, only the system LSI (integrated circuit) of the playback devices of the embodiments that perform essential parts of the processing may be implemented. Because these playback devices and the integrated circuit are all inventions disclosed in the specification of the present application, acts involving the manufacture of playback devices based on an internal structure of the playback devices shown in Embodiment 6 are implementations of the inventions disclosed in the specification of the present application. Acts that involve transferring (retail when cost is involved; a gift when no cost is involved), lending, or importing of playback devices shown in Embodiment 1 are also implementations of the present invention. Acts that involve approaching the general user about transfer, rental or the like by means of show-widow displays, catalogue solicitation, pamphlet distribution and the like are also implementations of these playback devices.

(C) Because of the information processing by a program shown in each flowchart being realized specifically using hardware resources, programs showing the processing procedures in the flowcharts form an invention in their own right. Although all of the embodiments show embodiments that relate to the implementation of programs pertaining to the present invention in an incorporated form in the playback devices, the program shown in Embodiment 1 may be implemented in their own right, separate from the playback devices. The implementation of the programs in their own right includes acts that involve: (1) production of the programs, (2) transference of the programs, either gratuitous or otherwise, (3) lending of the programs, (4) importing of the programs, (5) providing the programs publicly via bi-directional electronic communications circuits, and (6) approaching the general user about transfer, rental and the like by means of show-widow displays, catalogue solicitations pamphlet distribution, and so forth.

(D) Consider that the element of "time" relating to the steps executed in time-series in each flowchart is a required item for specifying the invention. If this is the case, then the processing procedures shown by the flowcharts can be understood as disclosing the usage configurations of the playback method. Execution of the processing in the flowcharts so as to achieve the original objects of the present invention and to enact the actions and effects by performing the processing of the steps in time-series is, needless to say, an implementation of the recording method pertaining to the present invention.

(E) When recording on a BD-ROM, extension headers are preferably appended to TS packets structuring AVClips. The extension headers, which are called TP_extra_header, include "Arrival_Time_Stamp" and "copy_permission_indicator", and have a 4-byte data length. TP_extra_header-attached TS packets (hereinafter, abbreviated to "EX-attached TS packet") are arranged into groups of 32 packets, and written into three sectors. Each group comprising 32 EX-attached TS packets is 6,144 bytes in length (=32×192), and matches the 6,144-byte size of three sectors (=2048×3). The grouping of 32 EX-attached TS packets contained in three sectors is referred to as an "Aligned Unit".

A playback device transmits Aligned Units in transmission processing as described below, when used in a home network connected via IEEE1394. That is, a device on the side of the sender removes the TP_extra_header from each of the 32 EX-attached TS packets included in an Aligned Unit, and outputs the TS packets after encoding the TS packet body based on a DTCP standard. When outputting TS packets, isochronous packets are inserted between all adjacent TS packets. The positioning of isochronous packets is based on times shown in the Arrival_Time_Stamp in each TP_extra_header. Playback device outputs a DTCP_Descriptor following the outputting of the TS packets. The DTCP_Descriptor shows a copy permissibility setting in each TP_extra_header. Here, if the DTCP_Descriptor is described so as to show "copy prohibited", TS packets will not be recorded on other devices when used in a home network connected via IEEE1394.

(F) Although digital streams in the embodiments are AVClips of BD-ROM format, the digital streams may be VOBs (Video Objects) complying with a DVD-Video standard or a DVD-Video Recording standard. VOBs are program streams compliant with ISO/IEC13818-1 obtained by multiplexing video and audio streams. Also, video streams in AVClips may be MPEG-4 format, WMV format, or the like. Furthermore, audio streams may be a Linear-PCM format, Dolby-AC3 format, MP3 format, MPEG-AAC format, or a dts format.

(G) Movie works in the embodiments may be obtained by encoding analog video signals broadcast by analog broadcast, or may be stream data constituted from transport streams broadcast by digital broadcast. Also, contents may be obtained by encoding analog/digital video signals recorded on videotape. Furthermore, contents may be obtained by encoding analog/digital video signals taken directly from a video camera. Alternatively, the contents may be digital copyrighted works distributed from a distribution server.

Although the above description states that, as to the parental control on a BD-ROM, branching is performed in units of PlayList, branching may be performed in units of PlayItem.

(H) Specifically speaking, multiple PlayLists have been created, and IN_times and Out_times are set so that PlayItems of each PlayList specify the same AVClip. As to PlayLists having parental blocks, the parental blocks are composed of multiple PlayItems, and multiple AVClps, each of which is different from one another, specify these PlayItems, respectively. Herewith, one of multiple PlayItems making up of the parental block can be played according to the stored value of PSR(13).

(I) Writing a rating level to SPRM may be carried out at the same time when the user inputs the age on the setup menu. Alternatively, this may be carried out when processing of the setup menu is finished.

INDUSTRIAL APPLICABILITY

The recording media and playback devices pertaining to the present invention can be used for personal applications— such as use in home theater systems. However, because the internal structures of the present invention are disclosed in the above embodiments and it is obvious that the present invention can be mass-manufactured based on the internal structures, the present invention naturally has industrial applicability. As such, recording media and playback devices pertaining to the present invention are applicable in the industries.

The invention claimed is:

1. A non-transitory recording medium, comprising:
a digital stream;
a plurality of pieces of playback path information, each indicating a playback path for the digital stream;
an operation mode object; and
a control program instructing a playback device to play the digital stream using the playback path information,
wherein the control program is a Java application controlled by the operation mode object, and
when instructing the playback device to play the digital stream using at least one of the pieces of playback path information, the control program causes the playback device to acquire a value indicating an age of a user stored in a status register by calling a state acquisition function to use the acquired value as a parameter for parental control,
the control program instructs the playback device to check a register-stored value indicating one of a region, and
the control program causes the playback device to play the digital stream using the at least one of the pieces of playback path information only if the register-stored value is a predetermined value.

2. A playback device, comprising:
an execution unit operable to execute a control program recorded on a recording medium;
a playback unit operable to play a digital stream recorded on the recording medium; and
a plurality of status registers,
wherein the recording medium has a plurality of pieces of playback path information and an operation mode object recorded thereon, one of the status registers stores therein a value indicating an age of a user, the control program is a Java application controlled by the operation mode object, and when executing the control program to cause the playback unit to play back the digital stream using at least one of the pieces of playback path information, the execution unit acquires a value indicating an age of a user stored in one of the status registers by calling a state acquisition function to use the acquired value as a parameter for parental control, the control program instructs the playback device to check a register-stored value indicating one of a region, and the control program causes the playback device to play the digital stream using the at least one of the pieces of playback path information only if the register-stored value is a predetermined value.

3. The playback device of claim 2, wherein the recording medium is a first recording medium, and one of the first recording medium and a second recording medium is loaded on the playback device, and the playback device, further comprising:

a conversion unit operable to convert a numeric indicating an age into a playback level when the second recording medium is loaded; and an auxiliary playback unit operable to, when the second recording medium is loaded, select from among a plurality of pieces of playback path information recorded on the second recording medium, a piece having the playback level, and play a digital stream recorded on the second recording medium according to the selected piece.

4. The playback device of claim 3, wherein the second recording medium has one or more country specific tables recorded thereon, each of the region specific tables describes mapping information in which rating levels of a rating system for a region are associated with level IDs, and the conversion into the playback level includes converting the age-indicating numeric into a rating level of a rating system for a country to which the playback device belongs, obtaining, from among level IDs in mapping information described in a region specific table for the region, a level ID associated with the rating level, and designating the obtained level ID as the playback level.

5. The playback device of claim 4, comprising:

a receiving unit operable to display a setup menu and receive an input of the age, and a conversion table associating a plurality-of ages with a plurality of rating levels in a one-to-one fashion, wherein the conversion into the rating level is performed by referring to the conversion table.

6. The playback device of claim 2, wherein the recording medium is a first recording medium, and one of the first recording medium and a second recording medium is loaded on the playback device, and the playback device, further comprising:

a receiving unit operable to display a setup menu and receive an input of a rating level on the setup menu;

a conversion unit operable to convert the input rating level into a numeric indicating an age; and an auxiliary playback unit operable to, when the second recording medium is loaded, select from among a plurality of pieces of playback path information recorded on the second recording medium, a piece having the input rating level, and play a digital stream recorded on the second recording medium according to the selected piece.

7. The playback device of claim 2, wherein the recording medium is a first recording medium, and one of the first recording medium and a second recording medium is loaded on the playback device, and the playback device, further comprising:

a receiving unit operable to display a menu showing combinations between ages and playback levels, and receive a specification for one of an age and a rating level;

a conversion table operable to perform interconversion between an age and a rating level based on the specification; and an auxiliary playback unit operable to, when the second recording medium is loaded, select from among a plurality of pieces of playback path information recorded on the second recording medium, a piece having a rating level matching the specified rating level, and play a digital stream recorded on the second recording medium according to the selected piece.

8. The playback device of claim 2, wherein one of the status registers stores therein a numeric indicating an age of a user, another one of the status registers stores therein a date of birth of the user, and the age-indicating numeric is calculated from the date of birth and a current date.

9. The playback device of claim 8, wherein the recording medium is a first recording medium, and one of the first recording medium and a second recording medium is loaded on the playback device, and the playback device, further comprising:

a conversion unit operable to convert, when the second recording medium is loaded and determined as the second recording medium, the age-indicating numeric into a playback level; and an auxiliary playback unit operable to select from among a plurality of pieces of playback path information recorded on the second recording medium, a piece having a playback level matching the playback level, and play a digital stream recorded on the second recording medium according to the selected piece, wherein the execution of the control program is performed only when the first recording medium is loaded.

10. A recording method for recording a digital stream and a plurality of pieces of playback path information each indicating a playback path for the digital stream, the recording method comprising the step of:

recording the digital stream and a control program instructing a playback device to play the digital stream using the playback path information, wherein the control program is a Java application controlled by the operation mode object, and when instructing the playback device to play the digital stream using at least one of the pieces of playback path information, the control program causes the playback device to acquire a value indicating an age of a user stored in a status register by calling a state acquisition function to use the acquired value as a parameter for parental control, the control program instructs the playback device to check a register-stored value indicating one of a region, and the control program causes the playback device to play the digital stream using the at least one of the pieces of playback path information only if the register-stored value is a predetermined value.

11. A playback device, comprising:

an execution unit operable to execute a control program recorded on a recording medium;

a playback unit operable to play a digital stream recorded on the recording medium; and a plurality of status registers, wherein the recording medium has a plurality of pieces of playback path information and an operation mode object recorded thereon, one of the status registers stores therein a value indicating an age of a user, the control program is a Java application controlled by the operation mode object, and when executing the control program to cause the playback unit to play back the digital stream using at least one of the pieces of playback path information, the execution unit acquires a value indicating an age of a user stored in one of the status registers by calling a state acquisition function to use the acquired value as a parameter for parental control, wherein the recording medium is a first recording medium, and one of the first recording medium and a second recording medium is loaded on the playback device, and the playback device further comprising:

a conversion unit operable to convert a numeric indicating an age into a playback level when the second recording medium is loaded; and an auxiliary playback unit operable to, when the second recording medium is loaded, select from among a plurality of pieces of playback path information recorded on the second recording medium, a piece having the playback level, and play a digital stream recorded on the second recording medium according to the selected piece.

12. A playback device, comprising:

an execution unit operable to execute a control program recorded on a recording medium;

a playback unit operable to play a digital stream recorded on the recording medium; and a plurality of status registers, wherein the recording medium has a plurality of pieces of playback path information and an operation mode object recorded thereon, one of the status registers stores therein a value indicating an age of a user, the control program is a Java application controlled by the operation mode object, and when executing the control program to cause the playback unit to play back the digital stream using at least one of the pieces of playback path information, the execution unit acquires a value indicating an age of a user stored in one of the status registers by calling a state acquisition function to use the acquired value as a parameter for parental control, wherein the recording medium is a first recording medium, and one of the first recording medium and a second recording medium is loaded on the playback device, and the playback device further comprising:

a receiving unit operable to display a menu showing combinations between ages and playback levels, and receive a specification for one of an age and a rating level;

a conversion table operable to perform interconversion between an age and a rating level based on the specification; and an auxiliary playback unit operable to, when the second recording medium is loaded, select from among a plurality of pieces of playback path information recorded on the second recording medium, a piece having a rating level matching the specified rating level, and play a digital stream recorded on the second recording medium according to the selected piece.

* * * * *